(12) United States Patent
Kudo

(10) Patent No.: US 12,566,917 B2
(45) Date of Patent: Mar. 3, 2026

(54) SERVER APPARATUS AND CLIENT APPARATUS

(71) Applicant: Brother Kogyo Kabushiki Kaisha, Nagoya (JP)

(72) Inventor: Yasuhiro Kudo, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 132 days.

(21) Appl. No.: 18/477,919

(22) Filed: Sep. 29, 2023

(65) Prior Publication Data

US 2024/0020469 A1 Jan. 18, 2024

Related U.S. Application Data

(63) Continuation of application No. PCT/JP2022/013017, filed on Mar. 22, 2022.

(30) Foreign Application Priority Data

Mar. 29, 2021 (JP) ................................ 2021-054626

(51) Int. Cl.
*G06F 40/197* (2020.01)
*G06F 40/166* (2020.01)

(52) U.S. Cl.
CPC .......... *G06F 40/197* (2020.01); *G06F 40/166* (2020.01)

(58) Field of Classification Search
CPC .................................................... G06F 40/197
See application file for complete search history.

(56) References Cited

U.S. PATENT DOCUMENTS

| | | | |
|---|---|---|---|
| 6,240,414 B1 | 5/2001 | Beizer et al. | |
| 2002/0059325 A1 | 5/2002 | Beizer et al. | |
| 2014/0195899 A1* | 7/2014 | Bastide et al. .......... | G06F 17/24 |
| 2015/0378972 A1 | 12/2015 | Kapadia et al. | |
| 2020/0293609 A1* | 9/2020 | Irigoyen et al. .... | G06F 17/2247 |

FOREIGN PATENT DOCUMENTS

| | | |
|---|---|---|
| CN | 103914439 A | 7/2014 |
| JP | H11-161535 A | 6/1999 |

OTHER PUBLICATIONS

Dec. 10, 2024—(JP) Notice of Reasons for Refusal—JP-App 2021-054626, Eng Tran.
Oct. 3, 2023—(WO) IPR and Written Opinion—App PCT/JP2022/013017.
Jun. 28, 2022—International Search Report—Intl App PCT/JP2022/013017.

* cited by examiner

*Primary Examiner* — James J Debrow
(74) *Attorney, Agent, or Firm* — Banner & Witcoff, Ltd.

(57) ABSTRACT

Provided are a server apparatus and a client apparatus by which a plurality of users efficiently edits a shared document. If the version of a document to be edited by the client apparatus device differs from the version of a server document, the server apparatus newly determines the editing object for the server document on the basis of a command and a path included in an edit instruction transmitted by the client apparatus and a command and a path included in a historical record. After the document which is the version included in the edit instruction has been edited on the basis of the edit instruction, the server apparatus determines the editing object for the server document so as to match the editing result of a case where the post-editing document is edited on the basis of historical information.

15 Claims, 15 Drawing Sheets

SERVER APPARATUS AND CLIENT APPARATUS

REFERENCE TO RELATED APPLICATIONS

This is a continuation application of International Application No. PCT/JP2022/013017 filed on Mar. 22, 2022, which claims priority from Japanese Patent Application No. 2021-54626 filed on Mar. 29, 2021. The entire contents of the advanced applications are incorporated herein by reference.

BACKGROUND ART

Various techniques have been proposed for allowing multiple users to collaboratively edit a common document in a communication system. A known art discloses a solution for a case where a plurality of users performs editing a document stored in a work folder and conflict occurs. In this solution, any user may be notified of a message asking how to resolve the conflict condition. The user notified of the message selects which of the plurality of conflicting documents is to be validated. In this case, the selected document is saved, and the unselected document is deleted, thereby resolving the conflict condition.

DESCRIPTION

Even when a conflict occurs, a document may be edited by a plurality of editing methods at the same time depending on how each of a plurality of users performs an editing operation. However, in the above-described method, since only one of the documents edited by a plurality of users is saved and stored and the remaining documents are deleted, there is an issue that it takes time for all the users to finish editing the documents by their respective editing methods.

The present disclosure enables a plurality of users to efficiently edit a common shared document.

According to one aspect of the present disclosure, a server apparatus determines a new editing object based on a first editing object, a first editing method, a second editing object and a second editing method when determined that a version (i.e., a first version) of a document to be edited in a client apparatus is different from a version (i.e., a second version) of a server document. Here, the first editing object and the first editing method are included in an editing instruction from the client apparatus. The second editing object and the second editing method are included in history information. The server apparatus determines the new editing object such that a result of editing the new editing object is identical to a result of editing the first editing object of a first document with the first editing method and then editing the second editing object of the edited first document with the second editing method. Therefore, the client apparatus efficiently edits a common document with other client apparatus.

According to another aspect of the present disclosure, a client apparatus determines an editing object of a second document based on a first editing object, a first editing method, a second editing object and a second editing method when determined that the pre-update version included in a change notification from a server apparatus is not identical to a version of the client document stored in the client apparatus. Here, the first editing object and the first editing method are included in the change notification. The second editing object and the second editing method are included in history information. The client apparatus determines the editing object of the second document such that a result of editing the editing object of the second document is identical to a result of editing the first editing object of a first document with the first editing method and then editing the second editing object of the edited first document with the second editing method. Thus, the client apparatus appropriately edits the client document regardless a timing of editing the client document based on the editing instruction and a timing of editing the client document based on the change notification.

An embodiment of the present disclosure will now be described with reference to the drawings. The drawings referred to are used to describe technical features that can be adopted by the present disclosure, and the configurations of the devices and the like described are not intended to be limited thereto but are merely illustrative examples.

Overview of Communication System 1

Figure 1:
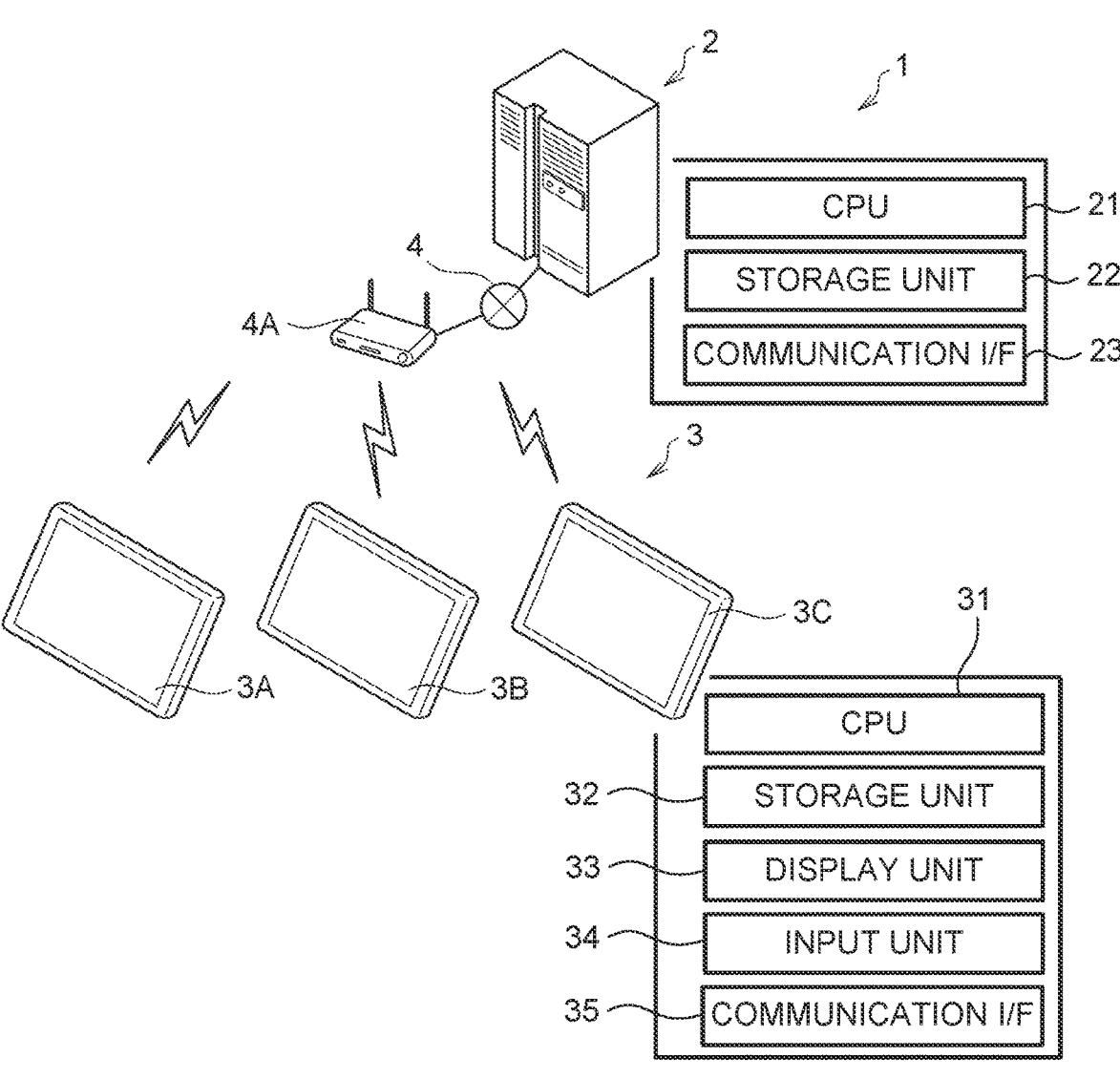
FIG. 1 is a diagram showing an outline of a communication system.

Referring to FIG. 1, an overview of a communication system 1 will be described. The communication system 1 includes a server apparatus 2 and client apparatuses 3A, 3B, and 3C (hereinafter collectively referred to as "client apparatus 3"). The server apparatus 2 is communicably connected to the access point 4A via the network line 4. The client apparatus 3 is connected to the access point 4A so as to be capable of wireless communication. Therefore, the server apparatus 2 and the client apparatus 3 can communicate with each other via the network line 4 and the access point 4A. The client apparatus 3 is a known tablet terminal.

The server apparatus 2 includes a CPU 21, a storage unit 22, and a communication interface (I/F) 23. The CPU 21 governs overall control of the server apparatus 2. The storage unit 22 stores a server program to be executed by the CPU 21, a document, and the like. An example of the document is handwriting data indicating handwriting. The handwriting data includes coordinate data for defining positions of a plurality of line segments constituting the handwriting, group data for classifying the plurality of line segments into groups, and the like. The CPU 21 is configured to directly edit the document stored in the storage unit 22. The communication I/F 23 may include a communication module for communicating with the client apparatus 3 via the network line 4 and the access point 4A.

The client apparatus 3 has a CPU 31, a storage unit 32, a display unit 33, an input unit 34, and a communication I/F 35. The CPU 31 governs overall control of the client apparatus 3. The storage unit 32 stores a client program to be executed by the CPU 31, a document, and the like. The CPU 31 receives the document from the server apparatus 2 and stores the document in the storage unit 32. The CPU 31 is configured to directly edit the document stored in the storage unit 32. The display unit 33 is a liquid crystal display. The input unit 34 is a touchscreen provided on a surface of the display unit 33. The communication I/F 35 is a communication module for communicating with the server apparatus 2 via the network line 4 and the access point 4A.

Referring to FIG. 2, an overview of operation in the communication system 1 will be described. It is assumed that a document indicating a character "A" formed by line segments L1 and L2 is stored in the storage unit 22 of the server apparatus 2. The character "A" includes an erroneously written portion M. First, a document indicating the character "A" is transmitted from the server apparatus 2 to each of the client apparatuses 3A and 3B, and then is stored in the storage unit 32 of each of the client apparatuses 3A and 3B. The document stored in the storage unit 32 is displayed on the display unit 33 of each of the client apparatuses 3A and 3B (see FIG. 2A).

Figure 2A:
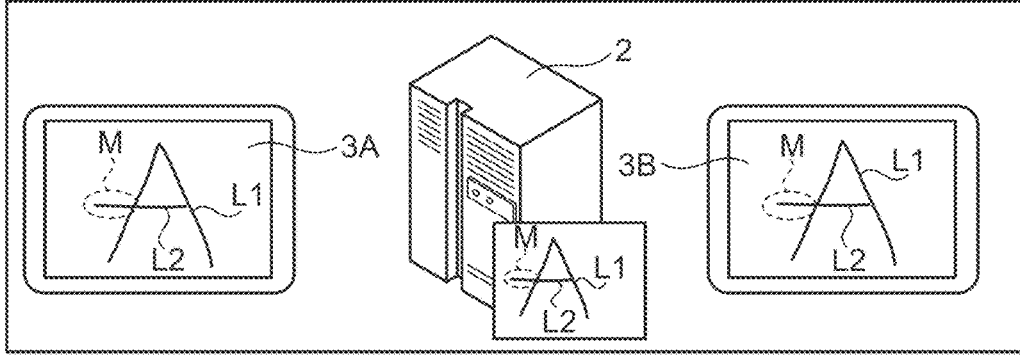
FIGS. 2A, 2B, 2C and 2D are diagrams showing an outline of an operation in the communication system.
Figure 2B:
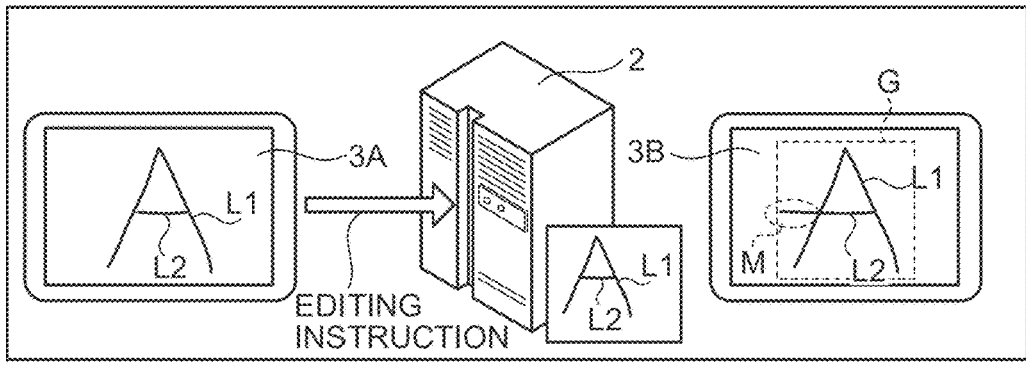
Figure 2C:
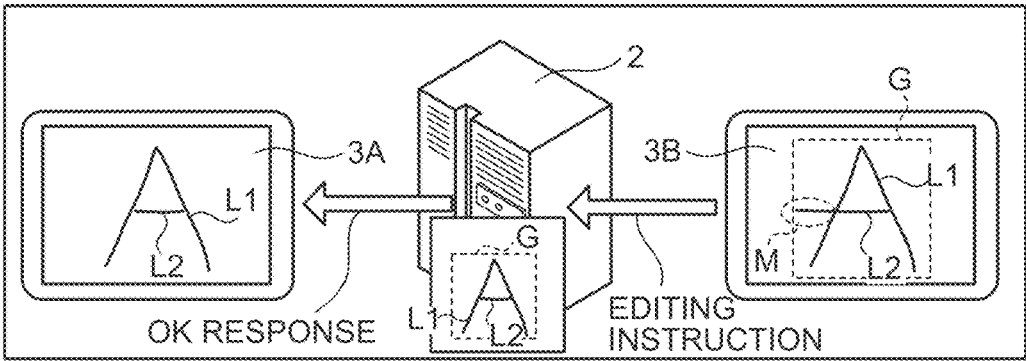

Here, as illustrated in FIG. 2B, it is assumed that a user of the client apparatus 3A performs an input operation of deleting and correcting the erroneously written portion M of the character "A". In this case, the client apparatus 3A transmits an editing instruction to delete the erroneously written portion M to the server apparatus 2 in order to edit the document stored in the storage unit 22 of the server apparatus 2 such that the erroneously written portion M does not appear in the document stored in the storage unit 22. The server apparatus 2 receives the editing instruction. The server apparatus 2 performs editing based on the editing instruction received from the client apparatus 3A on the document stored in the storage unit 22 and updates the document. As shown in FIG. 2C, the server apparatus 2 transmits to the client apparatus 3A an OK response notifying that the editing is completed. In practice, a change notification to be described later is transmitted from the server apparatus 2 to the client apparatus 3B, but is omitted here.

On the other hand, as illustrated in FIG. 2B, it is assumed that a user of the client apparatus 3B performs an input operation to classify the line segments L1 and L2 included in the character "A" into a group G. As illustrated in FIG. 2C, in order to edit the document stored in the storage unit 22 of the server apparatus 2 so that the line segments L1 and L2 are classified into the group G, the client apparatus 3B transmits an editing instruction for classifying the line segments L1 and L2 into the group G to the server apparatus 2. The server apparatus 2 receives the editing instruction transmitted from the client apparatus 3B. Here, the document stored in the storage unit 22 of the server apparatus 2 has already been edited based on the editing instruction received from the client apparatus 3A, and the erroneously written portion M has been deleted.

In such a case, the server apparatus 2 performs editing the already edited document based on the editing instruction received from the client apparatus 3B. To be more specific, as shown in FIG. 2C, the server apparatus 2 performs editing to classify the line segments L1 and L2 of the character "A"

in which the erroneously written portion M does not appear into the group G, and updates the document stored in the storage unit 22.

Figure 2D:
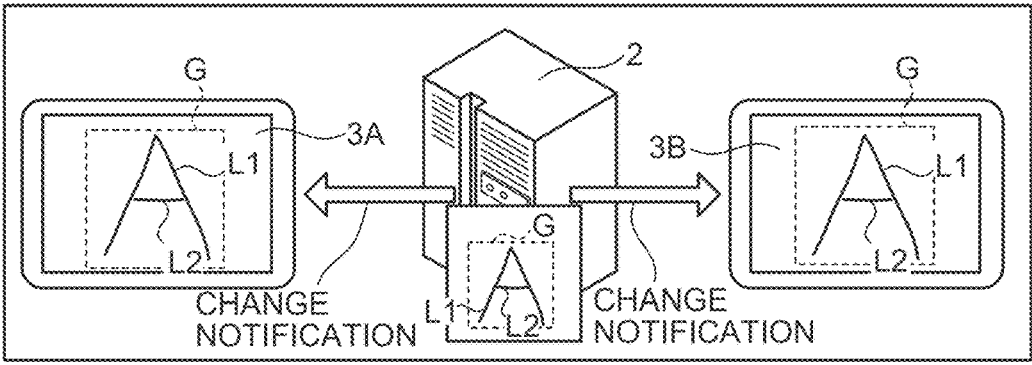
Figure 3:
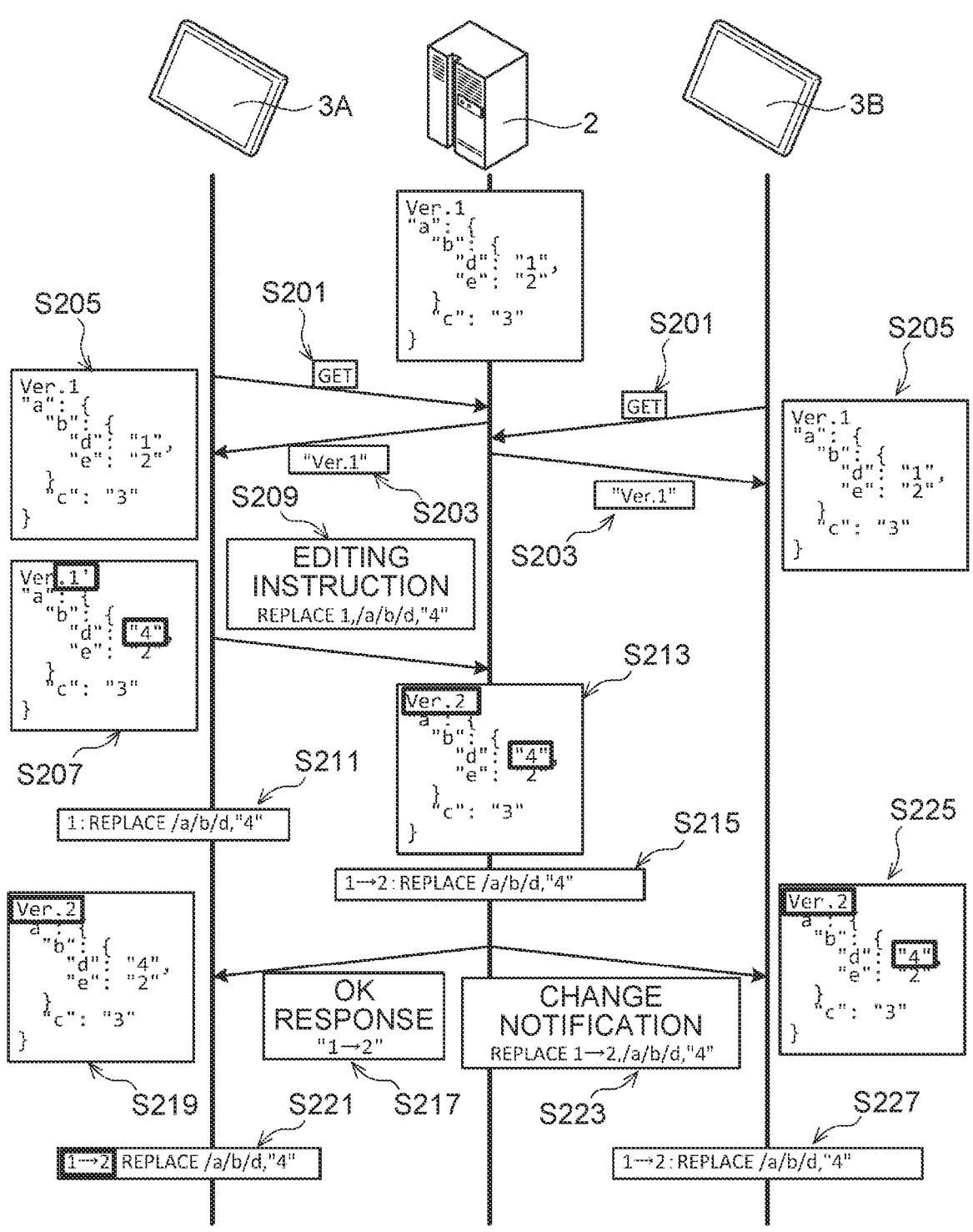
FIG. 3 is a diagram showing a first communication sequence.

As shown in FIG. 2D, the server apparatus 2 transmits a change notification to the client apparatuses 3A and 3B so that the updated document stored in the storage unit 22 is displayed on the display unit 33 of each of the client apparatuses 3A and 3B. Each of the client apparatuses 3A and 3B receives the change notification. Based on the received change notification, each of the client apparatuses 3A and 3B edits the document stored in the storage unit 32 thereof such that the document stored in the storage unit 32 of each of the client apparatuses 3A and 3B matches the document stored in the storage unit 22 of the server apparatus 2. Each of the client apparatuses 3A and 3B displays, on the display unit 33, the document in which the erroneously written portion M does not appear and the line segments L1 and L2 have been classified into the group G. Communication Sequence A communication sequence in the communication system 1 will be described with reference to FIGS. 3 to 15. In FIGS. 3 to 15, only the client apparatuses 3A and 3B are illustrated, and the client apparatus 3C is omitted. The document stored in the storage unit 22 is referred to as a "server document". The document stored in the storage unit 32 is referred to as a "client document". First Communication Sequence In the first communication sequence shown in FIG. 3, editing of the client document is performed only by the user of the client apparatus 3A. In the first communication sequence, documents stored in the server apparatus 2 and the client apparatus 3 are shown in the JavaScript Object Notation (JSON) format. As shown in FIG. 3, the server document of Ver. 1 is stored in the storage unit 22 of the server apparatus 2. For the server document of Ver. 1, "1" is stored as a value of a path "/a/b/d", "2" is stored as a value of a path "/a/b/e", and "3" is stored as a value of the path "/a/c".

The client apparatuses 3A and 3B transmit a command "GET" to the server apparatus 2 in order to obtain a document from the server apparatus 2 (S201). The server apparatus 2 receives the command "GET", reads the server document of Ver. 1, and transmits the server document of Ver. 1 to the client apparatuses 3A and 3B (S203). The client apparatuses 3A and 3B receive the document of Ver. 1. Each of the client apparatuses 3A and 3B stores the received document in the storage unit 32 as a client document of Ver. 1 (S205).

It is assumed that the user of the client apparatus 3A inputs an operation of changing the value of the path "/a/b/d" of the client document of Ver. 1 from "1" to "4". In this case, the client apparatus 3A edits the client document of Ver. 1 in accordance with the user's operation (S207). Further, the client apparatus 3A temporarily updates the version of the edited client document from Ver. 1 to Ver. 1' (S207). The client apparatus 3A transmits to the server apparatus 2 an editing instruction including a command "REPLACE", as an editing method, indicating a change of a value, a version "1" of a document of an editing object, a path "/a/b/d" indicating the editing object, and a value "4" (S209). The client apparatus 3A stores the version "1", the command "REPLACE", the path "/a/b/d", and the value "4" included in the transmitted editing instruction in the storage unit 32 as the history information (S211).

The server apparatus 2 receives the editing instruction sent by the client apparatus 3A in S209. The server apparatus 2 determines that the version "1" included in the editing instruction matches the version "1" of the server document. In this case, the server apparatus 2 changes the value of the path "/a/b/d" from "1" to "4" in the server document of Ver. 1 (S213). Further, the server apparatus 2 updates the version of the server document from Ver. 1 to Ver. 2 (S213). Further, the server apparatus 2 stores the command, the path, and the value included in the editing instruction in the storage unit 22 as history information (S215). Further, the server apparatus 2 stores information indicating that the version has been updated (hereinafter referred to as "version update information") in the storage unit 22 as history information (S215). The version update information indicates a pre-update version that is a version of the document before edit and a post-update version that is a version of the document after edit.

The server apparatus 2 transmits an OK response including the version update information "1->2" and indicating that the editing of the server document is completed to the client apparatus 3A that has transmitted the editing instruction (S217). The client apparatus 3A receives the OK response. The client apparatus 3A updates the version of the client document from Ver. 1' to Ver. 2 based on the version update information included in the OK response (S219). Further, the client apparatus 3A updates the version "1" stored as the history information to the version "2" based on the version update information "1->2" (S221).

In addition, the server apparatus 2 transmits a change notification to the client apparatus 3B in order to cause the client document of the client apparatus 3B to be edited in accordance with the editing of the server document (S223). The change notification includes the command "REPLACE", the version update information "1->2", the path "/a/b/d", and the value "4" based on the history information stored in S215. The client apparatus 3B receives the change notification.

The client apparatus 3B changes the value of the path "/a/b/d" of the client document of Ver. 1 from "1" to "4" (S225). Further, the client apparatus 3B updates the version of the client document from Ver. 1 to Ver. 2 (S225). Further, the client apparatus 3B stores the version change information, the command, the path, and the value included in the change notification in the storage unit 32 as history information (S227).

Second Communication Sequence

Figure 4:
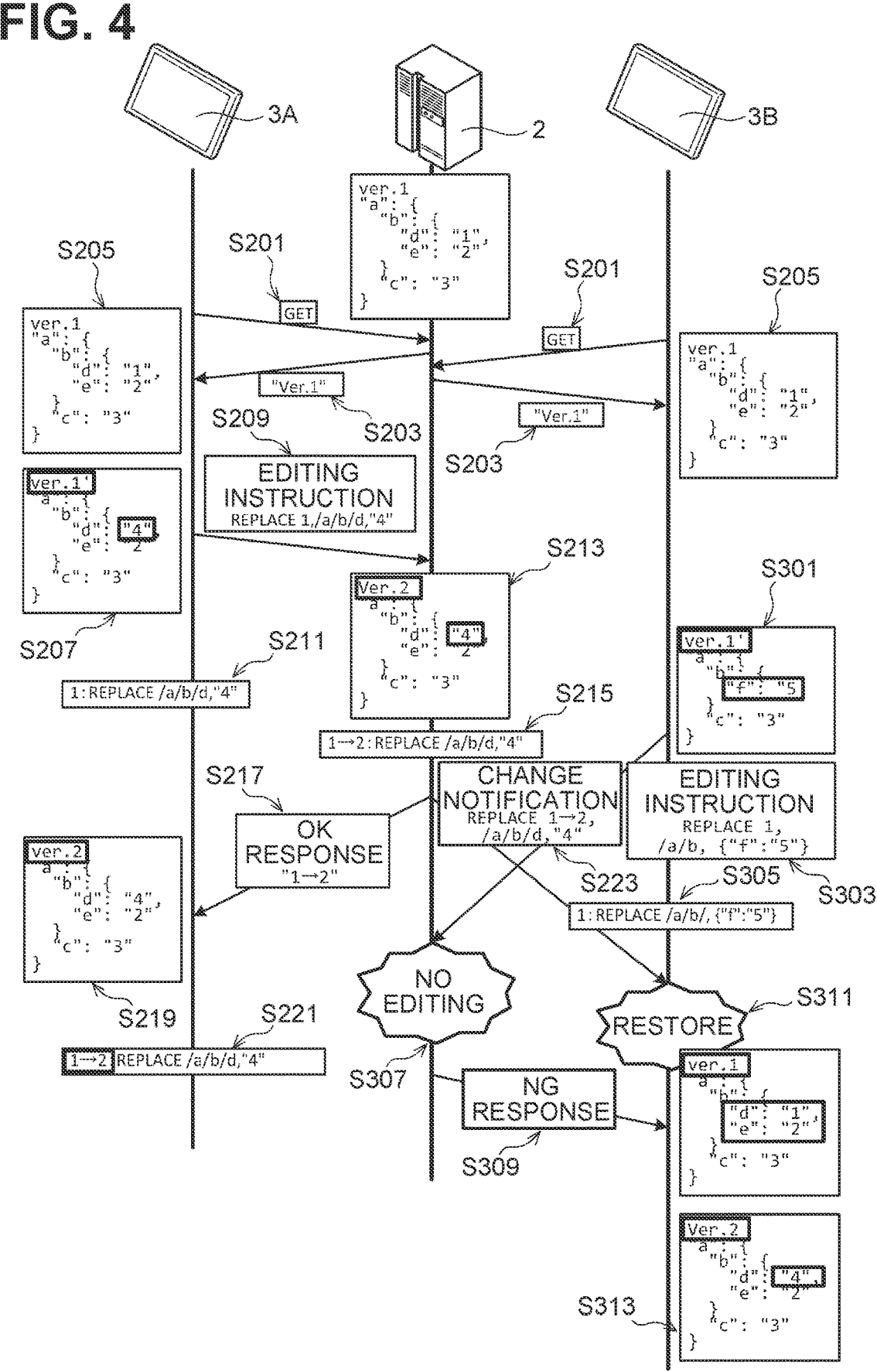
FIG. 4 is a diagram showing a second communication sequence.

In the second communication sequence illustrated in FIG. 4, the user of each of the client apparatuses 3A and 3B edits the client document. Only editing by the user of the client apparatus 3A is enabled, and the server document of the server apparatus 2 is edited. The same steps as those of the first communication sequence are denoted by the same reference numerals, and description thereof is omitted. In the second communication sequence, documents stored in the server apparatus 2 and the client apparatus 3 are shown in the JSON format.

It is assumed that the user of the client apparatus 3B inputs an operation of editing the client document of Ver. 1 before the client apparatus 3B receives the change notification transmitted from the server apparatus 2 in S223. The editing content defines a path "/a/b/f" instead of the paths "/a/b/d" and "a/b/e", and sets "5" as the value of the path "/a/b/f". In this case, the client apparatus 3B edits the client document of Ver. 1 in accordance with the user's operation (S301). Further, the client apparatus 3B temporarily updates the version of the edited client document to Ver. 1' (S301). The client apparatus 3B transmits an editing instruction including the command "REPLACE", the version "1", the path "/a/b", the path "f" to be replaced, and the value "5" to the server apparatus 2 (S303). The client apparatus 3B stores the version, the command, the path, and the value included in the transmitted editing instruction in the storage unit 32 as history information (S305).

The server apparatus 2 receives the editing instruction transmitted by the client apparatus 3B. The server apparatus 2 determines that the version "1" included in the editing instruction is different from the version "2" of the server document. Here, the path "/a/b/d" stored as history information in S215 in the server apparatus 2 includes the path "/a/b" included in the editing instruction transmitted from the client apparatus 3B in S303. In this case, the server apparatus 2 determines not to edit the server document of Ver. 2 stored in the storage unit 22 (S307). The server apparatus 2 transmits an NG response indicating that the server document has not been edited to the client apparatus 3B (S309).

Meanwhile, the client apparatus 3B receives the change notification transmitted by the server apparatus 2 in S223. The client apparatus 3B determines that the pre-update version "1" of the version update information "1->2" included in the received change notification is different from the version "1'" of the client document of the client apparatus 3B. Here, the path "/a/b" stored as history information in S305 in the client apparatus 3B is included in the path "/a/b/d" included in the change notification transmitted from the server apparatus 2 in S223. In this case, the client apparatus 3B replaces the client document edited in S301 with the client document stored in the storage unit 32 in S205, that is, the client document before edit (S311). Further, the client apparatus 3B replaces the version "1'" of the client document with "1".

After replacing the client document edited in S301 with the client document stored in the storage unit 32 in S205 (S311), the client apparatus 3B edits the client document based on the change notification transmitted by the server apparatus 2 in S223. For example, the client apparatus 3B changes the value of the path "/a/b/d" of the client document from "1" to "4" (S313). Further, the client apparatus 3B updates the version of the client document to Ver. 2 (S313).

Hereinafter, when one of a path included in an editing instruction received by the server apparatus 2 or a path stored as history information in the storage unit 22 of the server apparatus 2 is included in the other, a relationship between the editing instruction and the history information is referred to as a "conflict relationship". Similarly, when one of a path included in a change notification received by the client apparatus 3 or a path stored as history information in the storage unit 32 of the client apparatus 3 is included in the other, a relationship between the change notification and the history information is referred to as a "conflict relationship".

Third Communication Sequence

Figure 5:
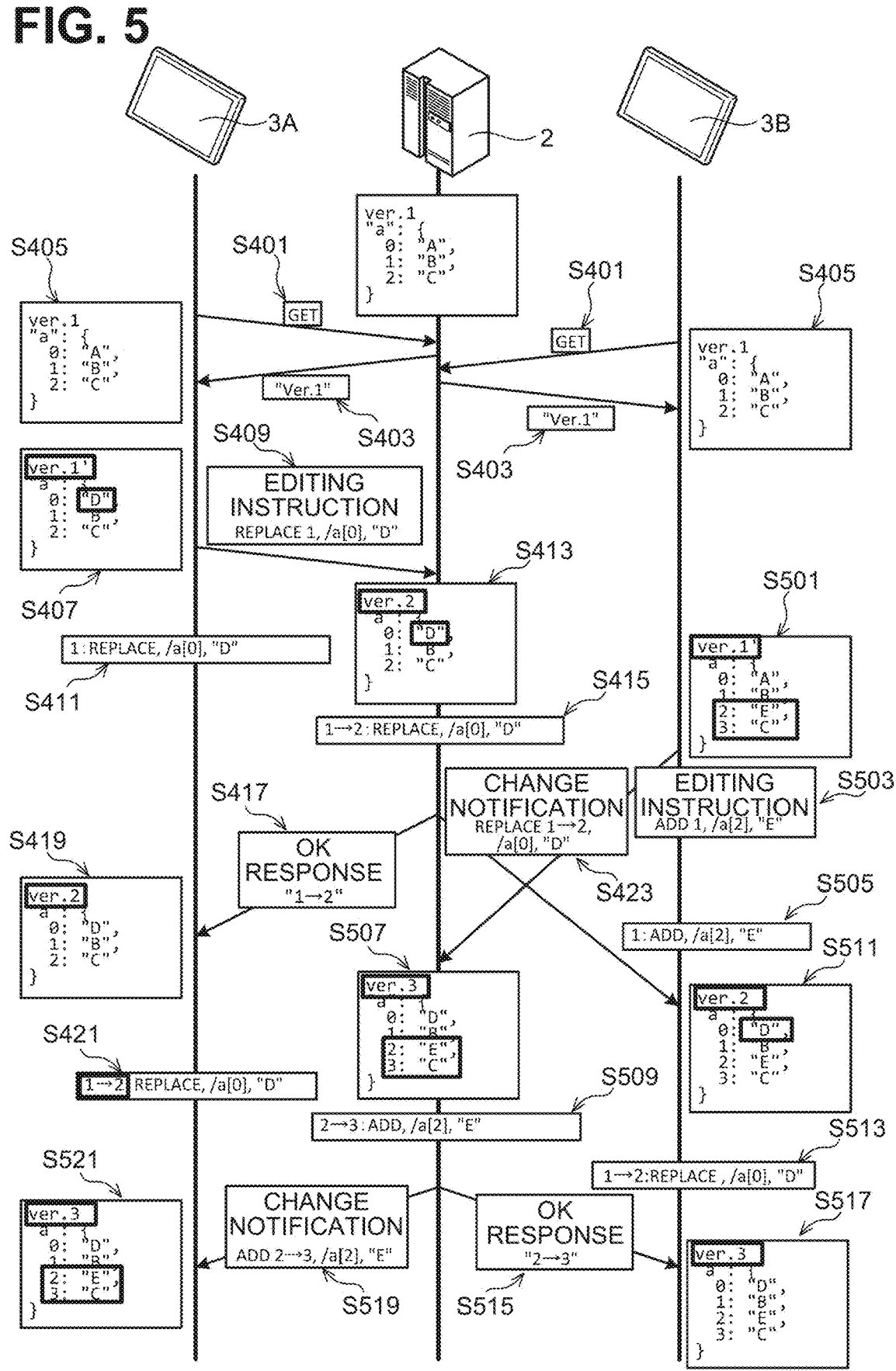
FIG. 5 is a diagram showing a third communication sequence.

In the third communication sequence illustrated in FIG. 5, the user of each of the client apparatuses 3A and 3B edits the client document. Also, unlike the second communication sequence, editing by the users of the client apparatuses 3A and 3B is enabled, and the server document of the server apparatus 2 is edited.

In the third communication sequence, documents stored in the server apparatus 2 and the client apparatus 3 are shown in an array format. As shown in FIG. 5, the server document of Ver. 1 is stored in the storage unit 22 of the server apparatus 2. In the server document of Ver. 1, "A" is stored as the value of the path "/a[0]", "B" is stored as the value of the path "/a[1]", and "C" is stored as the value of the path "/a[2]".

The client apparatuses 3A and 3B transmit a command "GET" to the server apparatus 2 in order to obtain a document from the server apparatus 2 (S401). The server apparatus 2 receives the command "GET" and transmits the server document of Ver. 1 to the client apparatuses 3A and 3B (S403). The client apparatuses 3A and 3B receive the document of Ver. 1. Each of the client apparatuses 3A and 3B stores the received document in the storage unit 32 as a client document of Ver. 1 (S405).

It is assumed that the user of the client apparatus 3A inputs an operation of changing the value of the path "/a[0]" of the client document of Ver. 1 from "A" to "D". In this case, the client apparatus 3A edits the client document of Ver. 1 in accordance with the user's operation (S407). Further, the client apparatus 3A temporarily updates the version of the edited client document to Ver. 1' (S407). The client apparatus 3A transmits an editing instruction including the command "REPLACE", the version "1", the path "/a[0]", and the value "D" to the server apparatus 2 (S409). The client apparatus 3A stores the version, the command, the path, and the value included in the transmitted editing instruction in the storage unit 32 as history information (S411).

The server apparatus 2 receives the editing instruction transmitted from the client apparatus 3A in S409. The server apparatus 2 determines that the version "1" included in the editing instruction matches the version "1" of the server document. In this case, the server apparatus 2 changes the value of the path "/a[0]" in the server document of Ver. 1 from "A" to "D" (S413). Further, the server apparatus 2 updates the version of the server document from Ver. 1 to Ver. 2 (S413). Further, the server apparatus 2 stores the command, the path, and the value included in the editing instruction in the storage unit 22 as history information (S415). Further, the server apparatus 2 stores the version update information "1->2" in the storage unit 22 as history information (S415).

The server apparatus 2 transmits an OK response including the version update information "1->2" to the client apparatus 3A that transmitted the editing instruction (S417). The client apparatus 3A receives the OK response. The client apparatus 3A updates the version of the client document from Ver. 1 to Ver. 2 (S419). Further, the client apparatus 3A updates the version "1" of the history information to the version "2" based on the version update information "1->2" (S421).

The server apparatus 2 also transmits a change notification to the client apparatus 3B (S423). The change notification includes the command "REPLACE", the version update information "1->2", the path "/a[0]", and the value "D" based on the history information stored in S415.

It is assumed that the user of the client apparatus 3B inputs an operation of editing the client document of Ver. 1 before the client apparatus 3B receives the change notification transmitted from the server apparatus 2 in S423. The editing content is to newly insert an array a[2] in which the value "E" is stored in the client document and update an index of the original array a[2] (value "C") from "2" to "3". In this case, the client apparatus 3B edits the client document of Ver. 1 in accordance with the user's operation (S501). Further, the client apparatus 3B temporarily updates the version of the edited client document to Ver. 1' (S501). The client apparatus 3B transmits, to the server apparatus 2, an editing instruction including a command "ADD" indicating insertion of a new array as an editing method, a version "1", a path "/a[2]" indicating the editing object, and a value "E" (S503). The client apparatus 3B stores the version, the command, the path, and the value included in the transmitted editing instruction in the storage unit 32 as history information (S505).

The server apparatus 2 receives the editing instruction transmitted by the client apparatus 3B. The server apparatus 2 determines that the version "1" included in the editing instruction is different from the current version "2" of the server document.

Here, a result that the server document of Ver. 1 is edited based on the editing instruction (ADD 1, /a[2], "E") and then the edited server document is edited based on the history information (1 REPLACE, /a[0], "D") stored in S415, and a result that the server document of Ver. 2 is edited based on the editing instruction (ADD1, /a [2], "E") from the client apparatus 3B are the same as the server document indicated in S507. In this case, the server apparatus 2 determines to edit the server document of Ver. 2 based on the editing instruction received from the client apparatus 3B. Then, the server apparatus 2 adds an array of the value "E" to the path "/a[2]" included in the editing instruction for the server document of Ver. 2 (S507). In addition, the server apparatus 2 updates the index "2" of the path a[2] in which the value "C" is stored before edit to "3" such that the value "C" is now stored in "a[3]" (S507). Further, the server apparatus 2 stores the version change information "2->3", the command, the path, and the value in the storage unit 22 as history information (S509).

On the other hand, the client apparatus 3B receives the change notification sent by the server apparatus 2 in S501 after editing the client document in S423. The client apparatus 3B determines that the pre-update version "1" of the version update information "1->2" included in the received change notification is different from the version "1" of the client document.

Here, a result of editing, based on the received change notification (REPLACE 1->2, /a[0], "D"), the client document before edit based on the history information stored in S505 and then editing the edited client document based on the history information stored in S505 (1 ADD, /a[2], "E") is identical to a result of editing the client document based on the received change notification after edited based on the history information stored in S505. In this case, the client apparatus 3B determines to edit the client document based on the change notification transmitted from the server apparatus 2 in S423. Then, the client apparatus 3B changes the path "/a[0]" included in the change notification to the value "D" for the client document (S511). Further, the client apparatus 3B updates the version of the client document from Ver. 1' to Ver. 2 (S511). Further, the client apparatus 3B stores the version change information, the command, the path, and the value included in the change notification in the storage unit 32 as history information (S513).

After updating the history information in S509, the server apparatus 2 transmits an OK response including the version update information "2->3" to the client apparatus 3B that transmitted the editing instruction in S503 (S515). The client apparatus 3B receives the OK response. The client apparatus 3B updates the version of the client document from Ver. 2 to Ver. 3 (S517).

In addition, the server apparatus 2 transmits a change notification to the client apparatus 3A in order to notify the client apparatus 3A that the server document has been edited based on the editing instruction transmitted from the client apparatus 3B in S503 (S519). The change notification includes the command "ADD", the version update information "2->3", the path "/a[2]", and the value "E" based on the history information stored in S509.

The client apparatus 3A receives the change notification transmitted by the server apparatus 2. The client apparatus 3A determines that the pre-update version "2" of the version update information "2->3" included in the received change notification matches the version "2" of the client document. In this case, the client apparatus 3A adds an array of the value "E" to the path "/a[2]" included in the change notification for the client document (S521). In addition, the server apparatus 2 updates the index "2" of a[2] in which the value "C" is stored before edit to "3" such that the value "C" is now stored in a[3] (S521).

Hereinafter, in the server apparatus 2, the relationship between the editing instruction and the history information is referred to as "sparse relationship" in a case where a result that the server document before updating the version is edited on the basis of the editing instruction and then the edited server document is edited on the basis of the history information is identical to a result that the server document after updating the version is edited on the basis of the editing instruction. Similarly, the relationship between the change notification and the history information is referred to as "sparse relationship" in the case where a result that the client document is edited based on the history information after the client document before edit based on the history information is edited based on the change notification is identical to a result that the client document is edited based on the history information after editing based on the history information is edited based on the change notification.

Fourth Communication Sequence

Figure 6:
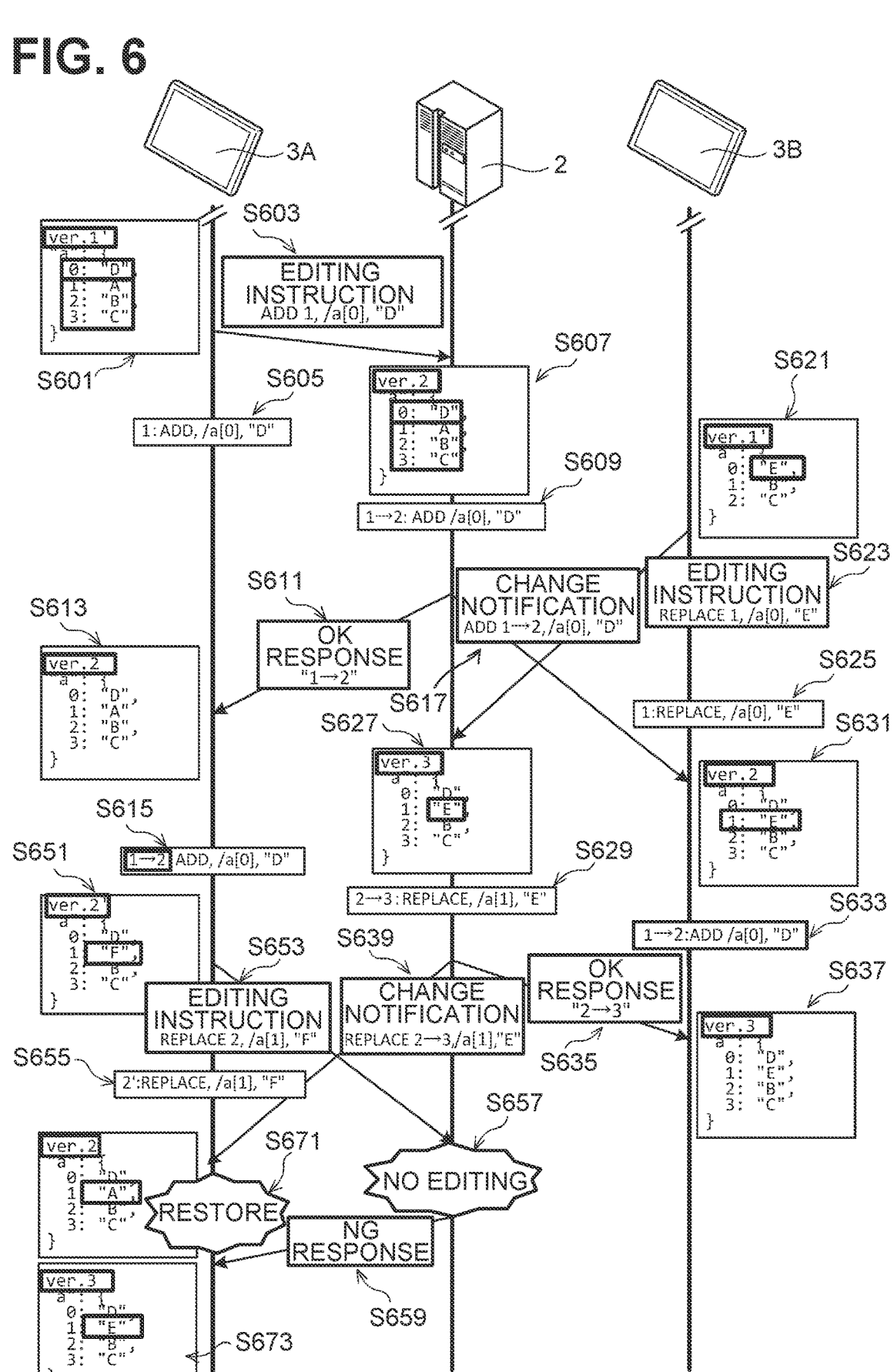
FIG. 6 is a diagram showing a fourth communication sequence.

In the fourth communication sequence illustrated in FIG. 6, each user of the client apparatuses 3A and 3B edits a document. Also, unlike the third communication sequence, only editing by the user of the client apparatus 3B is enabled, and the server document of the server apparatus 2 is edited. In the fourth communication sequence, documents stored in the server apparatus 2 and the client apparatus 3 are shown in an array format. The same procedures as those in the third communication sequence (see FIG. 5) are denoted by the same reference numerals, and description thereof will be omitted. Although not shown in FIG. 6, communication is first performed in the same procedure as that from S401 to S405 in FIG. 5.

It is assumed that the user of the client apparatus 3A inputs an operation of newly inserting the array a[0] in which the value "D" is stored in the client document of Ver. 1 and updating the indexes of the original arrays a[0]-a[2]. In this case, the client apparatus 3A edits the client document of Ver. 1 in accordance with the user's operation (S601). Further, the client apparatus 3A temporarily updates the version of the edited client document to Ver. 1' (S601). The client apparatus 3A transmits an editing instruction including the command "ADD", the version "1", the path "/a[0]", and the value "D" to the server apparatus 2 (S603). The client apparatus 3A stores the version, the command, the path, and the value included in the transmitted editing instruction in the storage unit 32 as history information (S605).

The server apparatus 2 receives the editing instruction sent by the client apparatus 3A in S603. The server apparatus 2 determines that the version "1" included in the editing instruction matches the version "1" of the server document. In this case, the server apparatus 2 adds an array of the value "D" to the path "/a[0]" included in the editing instruction for the server document of Ver. 1 (S607). In addition, the server apparatus 2 updates the respective indexes of the arrays a[0]-a[2] before edit to be arrays a[1]-a[3] (S607). Further, the server apparatus 2 updates the version of the server document from Ver. 1 to Ver. 2 (S607). Further, the server apparatus 2 stores the command, the path, and the value included in the editing instruction in the storage unit 22 as history information (S609). Further, the server apparatus 2 stores the version update information "1->2" in the storage unit 22 as history information (S611).

The server apparatus 2 transmits an OK response including the version update information "1->2" to the client apparatus 3A that transmitted the editing instruction (S611). The client apparatus 3A receives the OK response. The client apparatus 3A updates the version of the client document from Ver. 1' to Ver. 2 (S613). Further, the client apparatus 3A updates the version "1" of the history information to the version "2" based on the version update information "1->2" (S615).

The server apparatus 2 also sends a change notification to the client apparatus 3B (S617). The change notification includes the command "ADD", the version update information "1->2", the path "/a[0]", and the value "D" based on the history information stored in S609.

It is assumed that the user of the client apparatus 3B inputs an operation of editing the client document of Ver. 1 before the client apparatus 3B receives the change notification transmitted from the server apparatus 2 in S617. The editing content is to change the value of the path "/a[0]" to "E" in the client document. In this case, the client apparatus 3B edits the client document of Ver. 1 in accordance with the user's operation (S621). Further, the client apparatus 3B temporarily updates the version of the edited client document to Ver. 1' (S621). The client apparatus 3B transmits an editing instruction including the command "REPLACE", the version "1", the path "/a[0]" indicating the editing object, and the value "E" to the server apparatus 2 (S623). In addition, the client apparatus 3B stores the command, version, path, and value included in the transmitted editing instruction in the storage unit 32 as history information (S625).

The server apparatus 2 receives the editing instruction transmitted from the client apparatus 3B in S623. The server apparatus 2 determines that the version "1" included in the editing instruction is different from the version "2" of the server document stored in the storage unit 22.

Here, the server apparatus 2 determines that the path indicating the editing object of the server document of Ver. 1 edited based on the received editing instruction (REPLACE 1,/a[0], "E") is changed from "/a[0]" to "/a[1]" by editing the server document of Ver. 1 based on the history information (1->2 ADD, /a[0], "D") stored in S609. In this case, the server apparatus 2 changes the value of the path "/a[1]" after change to "E" in the server document of Ver. 2 (S627). Further, the server apparatus 2 updates the version of the server document from "Ver. 2" to "Ver. 3" (S627). Further, the server apparatus 2 stores the version change information "2->3", the command, the path after the change, and the value in the storage unit 22 as history information (S629).

On the other hand, the client apparatus 3B receives the change notification transmitted from the server apparatus 2 by S621 after editing the client document stored in the storage unit 32 by S617. The client apparatus 3B determines that the pre-update version "1" of the version update information "1->2" included in the received change notification is different from the version "1" of the client document.

Here, the client apparatus 3B determines that the path indicating the editing object of the command "REPLACE" stored as the history information is changed from "/a[0]" to "/a[1]" by editing the client document of Ver. 1 (see S405 in FIG. 5) based on the change notification (ADD 1->2, /a[0], "D") transmitted from the server apparatus 2 in S617.

In this case, the client apparatus 3B determines to edit the client document based on the change notification received from the server apparatus 2. Then, the client apparatus 3B adds an array of the value "D" to the path "/a[0]" included in the change notification for the client document of Ver. 1 (see S405 in FIG. 5) (S631). In addition, the client apparatus 3B updates the respective indexes of the arrays a[0]-a[2] before edit to be arrays a[1]-a[3] (S631). Further, the client apparatus 3B changes the value of the path "/a[1]" after change to "E" based on the history information (S631). Further, the client apparatus 3B updates the version of the client document from Ver. 1' to Ver. 2 (S631). Further, the client apparatus 3B stores the command, the version change information, the path, and the value included in the change notification in the storage unit 32 as history information (S633).

Hereinafter, a relationship between an editing instruction and history information is referred to as "conditional sparse relationship" in a case where in the server apparatus 2, after editing a server document based on history information, a path is changed when subsequently editing by a command based on the editing instruction received from the client apparatus 3. In addition, a relationship between the change notification and the history information is referred to as "conditional sparse relationship" in a case where in the client apparatus 3, after editing the client document based on the change notification received from the server apparatus 2, a path is changed when subsequently editing based on the history information.

After updating the history information in S629, the server apparatus 2 transmits an OK response including the version update information "2->3" to the client apparatus 3B that transmitted the editing instruction in S623 (S635). The client apparatus 3B receives the OK response. The client apparatus 3B updates the version of the client document from Ver. 2 to Ver. 3 (S637). Further, the server apparatus 2 transmits a change notification to the client apparatus 3A (S639). The change notification includes the command "REPLACE", the version update information "2->3", the path "/a[1]", and the value "E" based on the history information stored in S629.

It is assumed that the user of the client apparatus 3A inputs an operation of editing the client document before the client apparatus 3A receives the change notification transmitted from the server apparatus 2 in S639. The editing content is to change the value of the path "/a[1]" to "F". In this case, the client apparatus 3A edits the client document of Ver. 2 in accordance with the user's operation (S651). Further, the client apparatus 3A temporarily updates the version of the edited client document to Ver. 2' (S651). The client apparatus 3A transmits an editing instruction including the command "REPLACE", the version "2", the path "/a[1]", and the value "F" to the server apparatus 2 (S653). The client apparatus 3A stores the version, the command, the path, and the value included in the transmitted editing instruction in the storage unit 32 as history information (S655).

The server apparatus 2 receives the editing instruction transmitted from the client apparatus 3A in S653. The server apparatus 2 determines that the version "2" included in the editing instruction is different from the version "3" of the server document stored in the storage unit 22. Here, the command "REPLACE" and the path "/a[1]" match between the history information stored in S629 and the received editing instruction. In this case, the server apparatus 2 determines that the server document of Ver. 3 is not edited (S657). The server apparatus 2 transmits an NG response to the client apparatus 3A (S659).

Hereinafter, in the server apparatus 2, the relationship between the editing instruction and the history information is referred to as "history command priority relationship" when the command is the same and the path is the same in each of the editing instruction and the history information. Similarly, although not illustrated, in the client apparatus 3, the relationship between the change notification and the history information is referred to as "history command priority relationship" when the command is the same and the path is the same in each of the change notification and the history information.

On the other hand, the client apparatus 3A receives the change notification transmitted from the server apparatus 2 in S639. The client apparatus 3A determines that the pre-update version "2" of the version update information "2->3" included in the received change notification is different from the version "T" of the client document. Here, the path "/a[1]" stored as the history information in S655 is included in the path "/a[1]" included in the change notification transmitted from the server apparatus 2 in S639. In this case, since the relationship between the change notification and the history information is the conflict relationship, the client apparatus 3A replaces the client document edited in S651 to the client document stored in the storage unit 32 in S613, that is, the client document before edit (S671). Further, the client apparatus 3A replaces the version "2'" of the client document with "2".

After replacing the client document edited in S651 with the client document stored in the storage unit 32 in S613 (S671), the client apparatus 3A edits the client document based on the change notification transmitted by the server apparatus 2 in S639. To be specific, the client apparatus 3A changes the value of the path "/a[1]" of the client document from "A" to "E" (S673). Further, the client apparatus 3A updates the version of the client document from Ver. 2 to Ver. 3 (S673).

Fifth Communication Sequence

Figure 7:
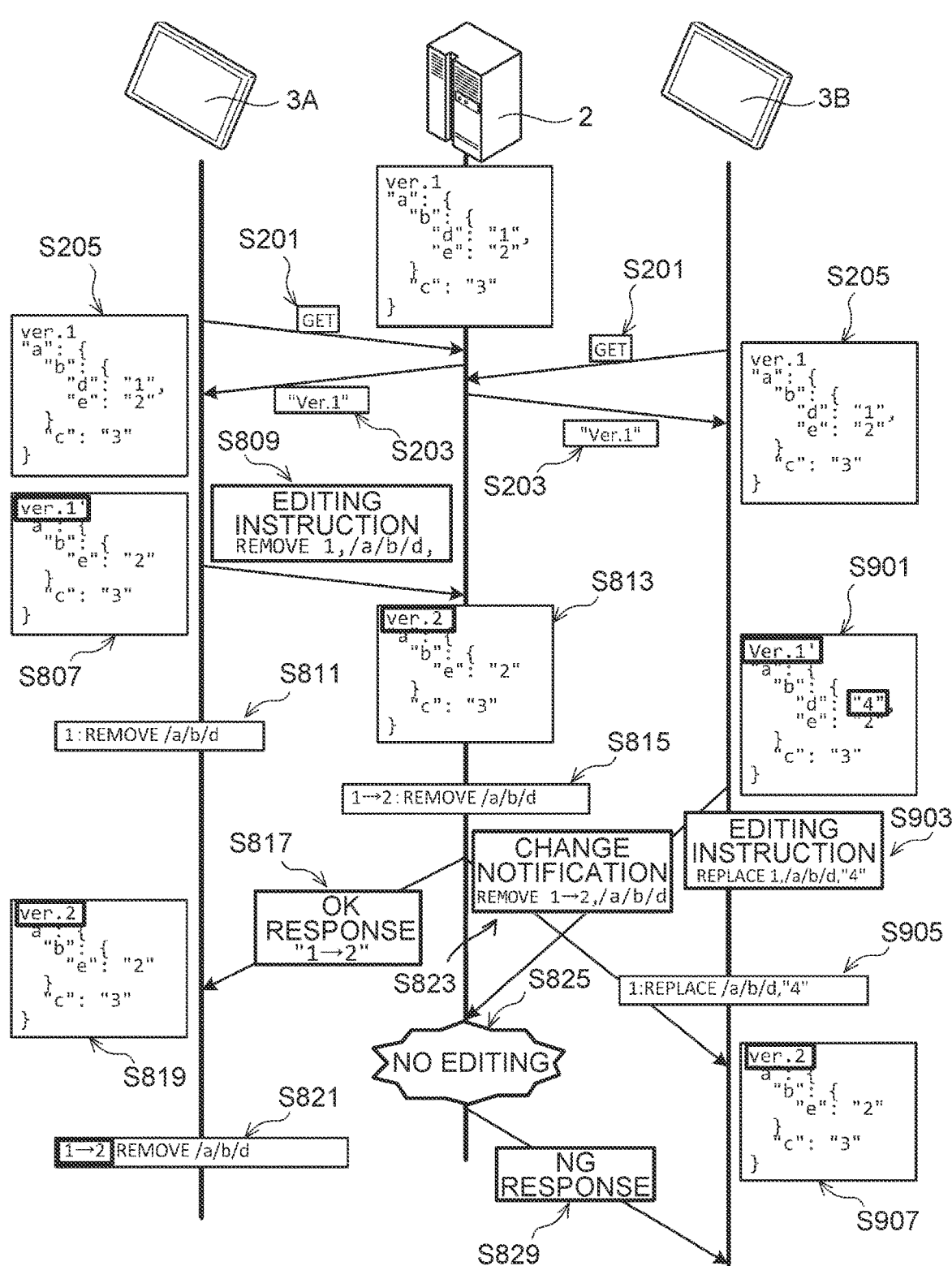
FIG. 7 is a diagram showing a fifth communication sequence.

In the fifth communication sequence illustrated in FIG. 7, the user of each of the client apparatuses 3A and 3B edits the client document. The same steps as those of the first communication sequence are denoted by the same reference numerals, and description thereof is omitted. In the fifth communication sequence, documents stored in the server apparatus 2 and the client apparatus 3 are shown in the JSON format.

It is assumed that the user of the client apparatus 3A inputs an operation of deleting the path "/a/b/d" of the client document of Ver. 1. In this case, the client apparatus 3A edits the client document of Ver. 1 in accordance with the user's operation (S807). Further, the client apparatus 3A temporarily updates the version of the edited client document to Ver. 1' (S807). The client apparatus 3A transmits the command "REMOVE" as the editing method indicating deletion of the path, the version "1" of the document to be edited, and the editing instruction including the path "/a/b/d" to be edited (i.e., deleted), to the server apparatus 2 (S809). Further, the client apparatus 3A stores the version "1", the command "REMOVE", and the path "/a/b/d" included in the transmitted editing instruction in the storage unit 32 as history information (S811).

The server apparatus 2 receives the editing instruction sent by the client apparatus 3A in S809. The server apparatus 2 determines that the version "1" included in the editing instruction matches the version "1" of the server document. In this case, the server apparatus 2 deletes the path "/a/b/d"

from the server document of Ver. 1 (S813). Further, the server apparatus 2 updates the version of the server document from Ver. 1 to Ver. 2 (S813). Further, the server apparatus 2 stores the command, the path, and the value included in the editing instruction in the storage unit 22 as history information (S815). Further, the server apparatus 2 stores the version update information "1->2" in the storage unit 22 as history information (S815).

The server apparatus 2 transmits an OK response including the version update information "1->2" and indicating that the editing of the server document is completed, to the client apparatus 3A that has transmitted the editing instruction (S817). The client apparatus 3A receives the OK response. The client apparatus 3A updates the version of the client document from Ver. 1' to Ver. 2 based on the version update information included in the OK response (S819). Further, the client apparatus 3A updates the version "1" stored as the history information to the version "2" based on the version update information "1->2" (S821).

In addition, the server apparatus 2 transmits a change notification to the client apparatus 3B in order to cause the client document of the client apparatus 3B to be edited in accordance with the editing of the server document (S823). The change notification includes the command "REMOVE", the version update information "1->2", and the path "/a/b/d" based on the history information stored in S815. The client apparatus 3B receives the change notification.

It is assumed that the user of the client apparatus 3B inputs an operation of editing the client document of Ver. 1 before the client apparatus 3B receives the change notification transmitted from the server apparatus 2 in S823. The editing content is to change the value of the path "/a/b/d" from "1" to "4". In this case, the client apparatus 3B edits the client document of Ver. 1 in accordance with the user's operation (S901). Further, the client apparatus 3B temporarily updates the version of the edited client document to Ver. 1' (S901). The client apparatus 3B transmits an editing instruction including the command "REPLACE", the version "1" of the document to be edited, the path "/a/b/d" indicating the editing object, and the value "4" to the server apparatus 2 (S903). The client apparatus 3B stores the version, the command, the path, and the value included in the transmitted editing instruction in the storage unit 32 as history information (S905).

The server apparatus 2 receives the editing instruction transmitted by the client apparatus 3B. The server apparatus 2 determines that the version "1" included in the editing instruction is different from the version "2" of the server document. Here, the server apparatus 2 determines that the priority of the command "REPLACE" included in the editing instruction transmitted from the client apparatus 3B in S903 is lower than the priority of the command "REMOVE" stored as the history information in S815. The relationship between the priority levels of the commands is defined in advance. In the present embodiment, the priority of the command "REMOVE" is set higher than the priority of the command "REPLACE". It is assumed that information indicating priority of a command is stored in the storage unit 32 in advance. In this case, the server apparatus 2 determines not to edit the server document of Ver. 2 stored in the storage unit 22 (S825). The server apparatus 2 transmits an NG response indicating that the server document has not been edited to the client apparatus 3B (S829).

Meanwhile, the client apparatus 3B receives the change notification transmitted by the server apparatus 2 in S823. The client apparatus 3B determines that the pre-update version "1" of the version update information "1->2"

included in the received change notification is different from the version "1'" of the client document. Here, the client apparatus 3B determines that the priority of the command "REMOVE" included in the change notification transmitted from the server apparatus 2 in S823 is higher than the priority of the command "REPLACE" included in the history information stored in S905. In this case, the client apparatus 3B determines to edit the client document based on the change notification received from the server apparatus 2. Then, the client apparatus 3B deletes the path "/a/b/d" included in the change notification with respect to the client document of Ver. 1' (S907). Further, the client apparatus 3B updates the version of the client document from Ver. 1' to Ver. 2 (S907).

Hereinafter, in the client apparatus 3, when the relationship between the change notification and the history information is neither the sparse relationship nor the conditional sparse relationship, and the priority of the command included in the received change notification is higher than the priority of the command stored in the history information, the relationship between the change notification and the history information is referred to as "received command priority relationship". Similarly, although not illustrated, in the server apparatus 2, when the relationship between the editing instruction and the history information is neither the sparse relationship nor the conditional sparse relationship, and the priority of the command included in the received editing instruction is higher than the priority of the command stored in the history information, the relationship between the editing instruction and the history information is referred to as "received command priority relationship".

Server Main Process

The server main process executed by the CPU 21 of the server apparatus 2 will be described with reference to FIG. 8 and FIG. 9. The server main process starts when the CPU 21 detects the editing instruction transmitted from the client apparatus 3 and then reads and executes the server program stored in the storage unit 22.

Figure 8:
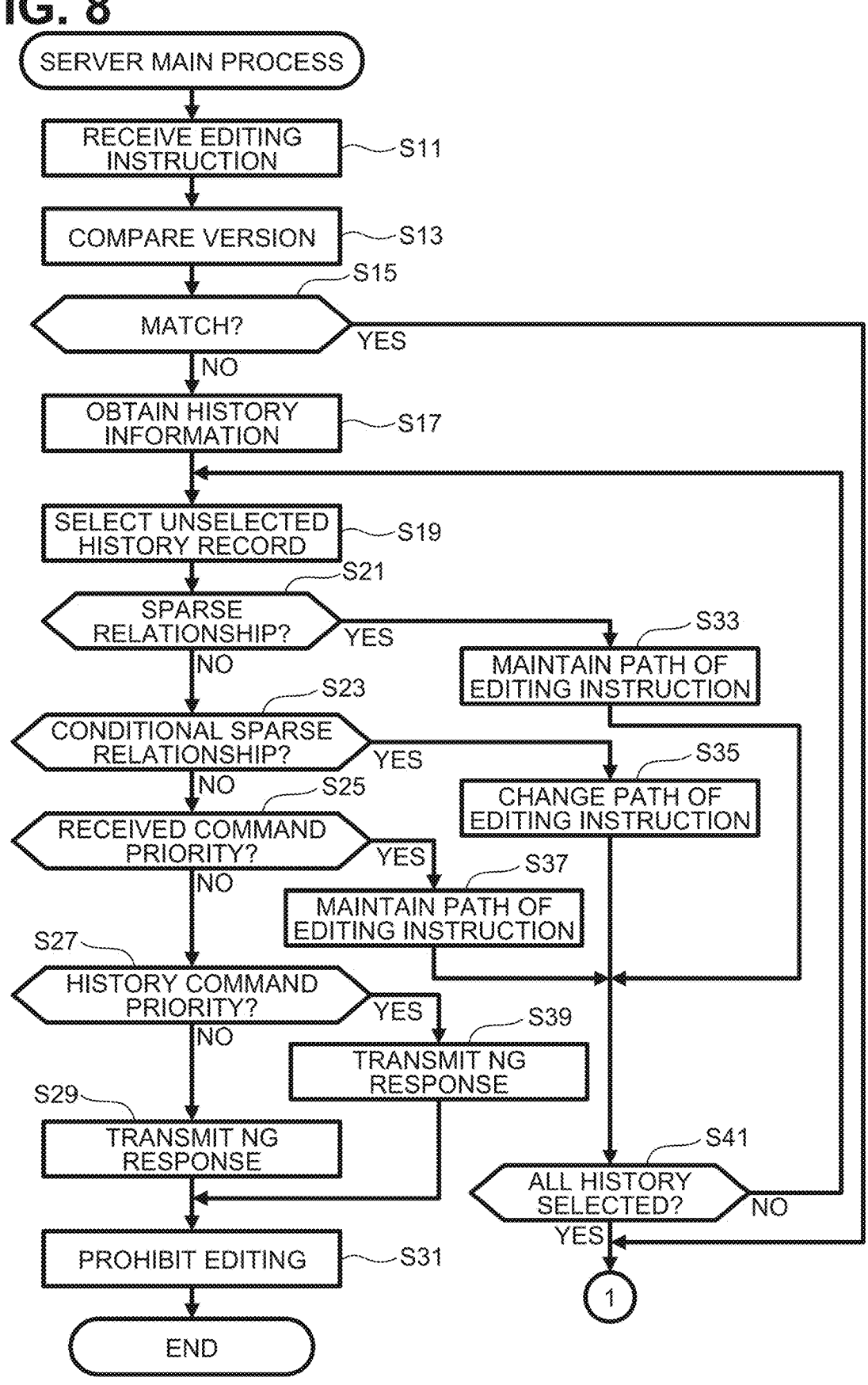
FIG. 8 is a flowchart of a server main process.

As shown in FIG. 8, the CPU 21 receives the editing instructions transmitted from the client apparatus 3 (S11). CPU 21 compares the version included in the received editing instruction with the version of the server document (S13). When it is determined that the versions match (S15: YES), the CPU 21 advances the processing to S51 (see FIG. 9).

Figure 9:
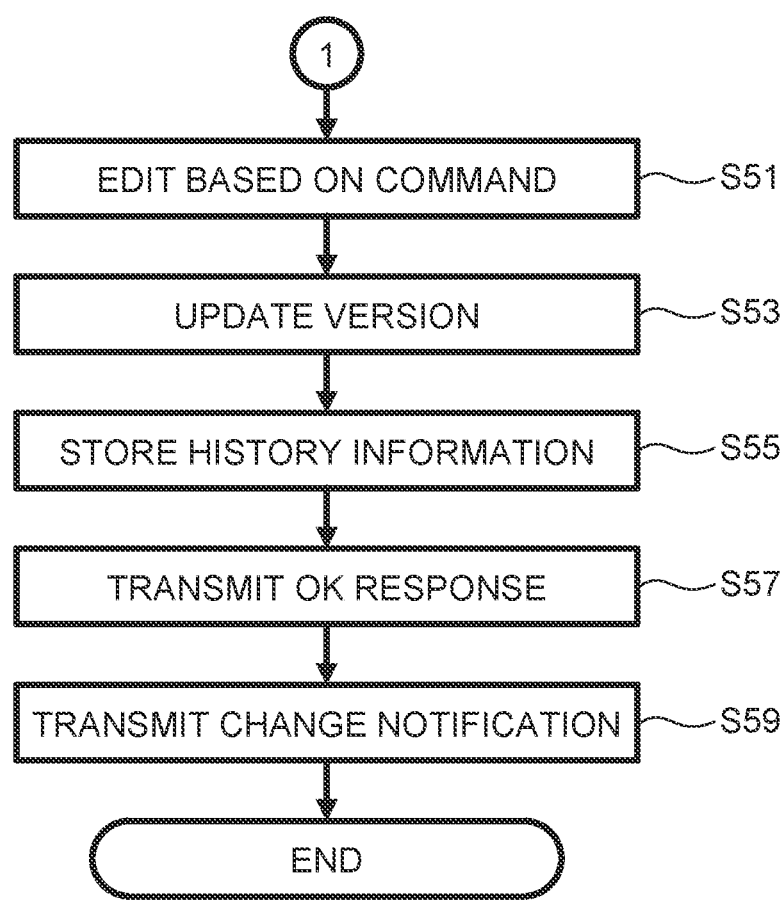
FIG. 9 is a flowchart of the server main process, which is a continuation of FIG. 8.

As shown in FIG. 9, the CPU 21 obtains a command and a path included in the editing instruction. CPU 21 edits the editing object indicated by the obtained path in the server document with the editing method indicated by the obtained command (S51). CPU 21 updates the version of the edited server document by adding one (1) (S53). CPU 21 stores the command, the path, and the value included in the editing instruction received in S11 (see FIG. 8) in the storage unit 22 as history information. Further, the CPU 21 stores version update information indicating that the version has been updated in the storage unit 22 as history information (S55). The version update information includes a pre-update version and a post-update version. Hereinafter, a set of "version update information, command, path, and value" in the history information is referred to as a "history record". The history records are sequentially stored in the storage unit 22 in the Last In, First Out (LIFO) format.

CPU 21 transmits an OK response to the client apparatus 3 that transmitted the editing instruction received in S11 (see FIG. 8) (S57). The CPU 21 transmits the change notification to the client apparatuses 3 other than the client apparatus 3 that has transmitted the editing instruction (S59). The change notification includes the command, the version update information, the path, and the value included in the history record stored in S55. The CPU 21 terminates the server main process.

On the other hand, as illustrated in FIG. 8, when the CPU 21 determines that the version included in the received editing instruction is different from the version of the server document (S15: NO), the process proceeds to S17. The CPU 21 obtains the history information stored in the storage unit 22 (S17). Note that the storage unit 22 may store a plurality of history records that are not selected in S19. The CPU 21 selects one unselected history record in the history information (S19). Based on the command and the path included in the selected history record and the command and the path included in the editing instruction received in S11, the CPU 21 newly determines a path indicating an editing object to be edited with the editing method indicated in the command included in the editing instruction in the server document. How the CPU 21 newly determines is described as follows.

The CPU 21 determines whether the editing instruction received in S11 and the history record selected in S19 are in the sparse relationship (S21). In a case where the CPU 21 determines that there is the sparse relationship (S21: YES), the CPU 21 advances the processing to S33. CPU 21 maintains the path included in the editing instruction (S33). In this case, in the server document, the editing object indicated by the path included in the editing instruction is edited with the editing method indicated in the command included in the editing instruction (S51; see FIG. 9). The CPU 21 advances the processing to S41.

If the CPU 21 determines that there is not the sparse relationship (S21: NO), the CPU 21 determines whether there is the conditional sparse relationship between the editing instruction received in S11 and the history record selected in S19 (S23). In a case where the CPU 21 determines that the relationship is the conditional sparse relationship (S23: YES), the CPU 21 advances the processing to S35. In this case, when the server document is edited based on the history record of the history information, the editing object of the server document to be edited based on the subsequently received editing instruction is changed, and thus the CPU 21 determines the path indicating the changed editing object (S35). In this case, the changed editing object indicated by the determined path in the server document is edited with the editing method indicated in the command included in the editing instruction (S51; see FIG. 9). The CPU 21 advances the processing to S41.

If the CPU 21 determines that there is not the conditional sparse relationship (S23: NO), the CPU 21 determines whether the editing instruction received in S11 and the history record selected in S19 are in the received command prioritized relationship (S25). When it is determined that they are in the received command priority relationship (S25: YES), the CPU 21 advances the processing to S37. CPU 21 maintains the path included in the editing instruction (S37). In this case, in the server document, the editing object indicated by the path included in the editing instruction is edited with the editing method indicated in the command included in the editing instruction (S51; see FIG. 9). The CPU 21 advances the processing to S41.

In S41, the CPU 21 determines whether all the history records stored in the storage unit 22 have been selected in S19 (S41). If any unselected history record remains (S41: NO), the CPU 21 returns the processing to S19. The CPU 21 selects an unselected history record (S19) and advances the process. When the CPU 21 determines that all the history records stored in the storage unit 22 have been selected in S19 (S41: YES), the CPU 21 advances the processing to S51 (see FIG. 9).

As shown in FIG. 9, the CPU 21 obtains the command included in the editing instructions, and the path determined in S33, S35 or S37 (see FIG. 8). The CPU 21 edits the editing object indicated by the obtained path in the server document with the editing method indicated by the acquired command (S51). The CPU 21 updates the version of the edited server document by adding one (1) (S53). The CPU 21 stores a history record including the version update information, the command and the value included in the editing instruction received in S11 (see FIG. 8), and the path determined in S33, S35 or S37 (see FIG. 8) in the storage unit 22 as history information (S55). The history records are sequentially stored in the storage unit 32 in the LIFO format.

The CPU 21 transmits an OK response to the client apparatus 3 that transmitted the editing instruction received in S11 (see FIG. 8) (S57). The CPU 21 transmits a change notification to the client apparatuses 3 other than the client apparatus 3 that has transmitted the editing instruction (S59). The CPU 21 terminates the server main process.

On the other hand, as shown in FIG. 8, when the CPU 21 determines that they are not in the received command priority relationship (S25: NO), the CPU 21 determines whether the editing instruction received in S11 and the history record selected in S29 are in the history command priority relationship (S27). When it is determined that they are in the history command priority relationship (S27: YES), the CPU 21 transmits an NG response to the client apparatus 3 that has transmitted the editing instruction (S39). The CPU 21 advances the processing to S31. On the other hand, when it is determined that they are not in the history command priority relationship (S27: NO), the CPU 21 determines that the editing instruction received in S11 and the history record selected in S19 are in the conflict relationship. The CPU 21 transmits an NG response to the client apparatus 3 that has transmitted the editing instruction (S29). The CPU 21 advances the processing to S31.

If the CPU 21 determines that there is the history command priority relationship or the conflict relationship (S27: YES then S39, S27: NO then S29), the CPU 21 prohibits editing the server document (S31). The CPU 21 terminates the server main process.

Client Main Process

The client main process executed by the CPU 31 of the client apparatus 3 will be described with reference to FIGS. 10 to 14. The client main process starts when the client apparatus 3 is turned on and the CPU 31 reads and executes the client program stored in the storage unit 32.

Figure 10:
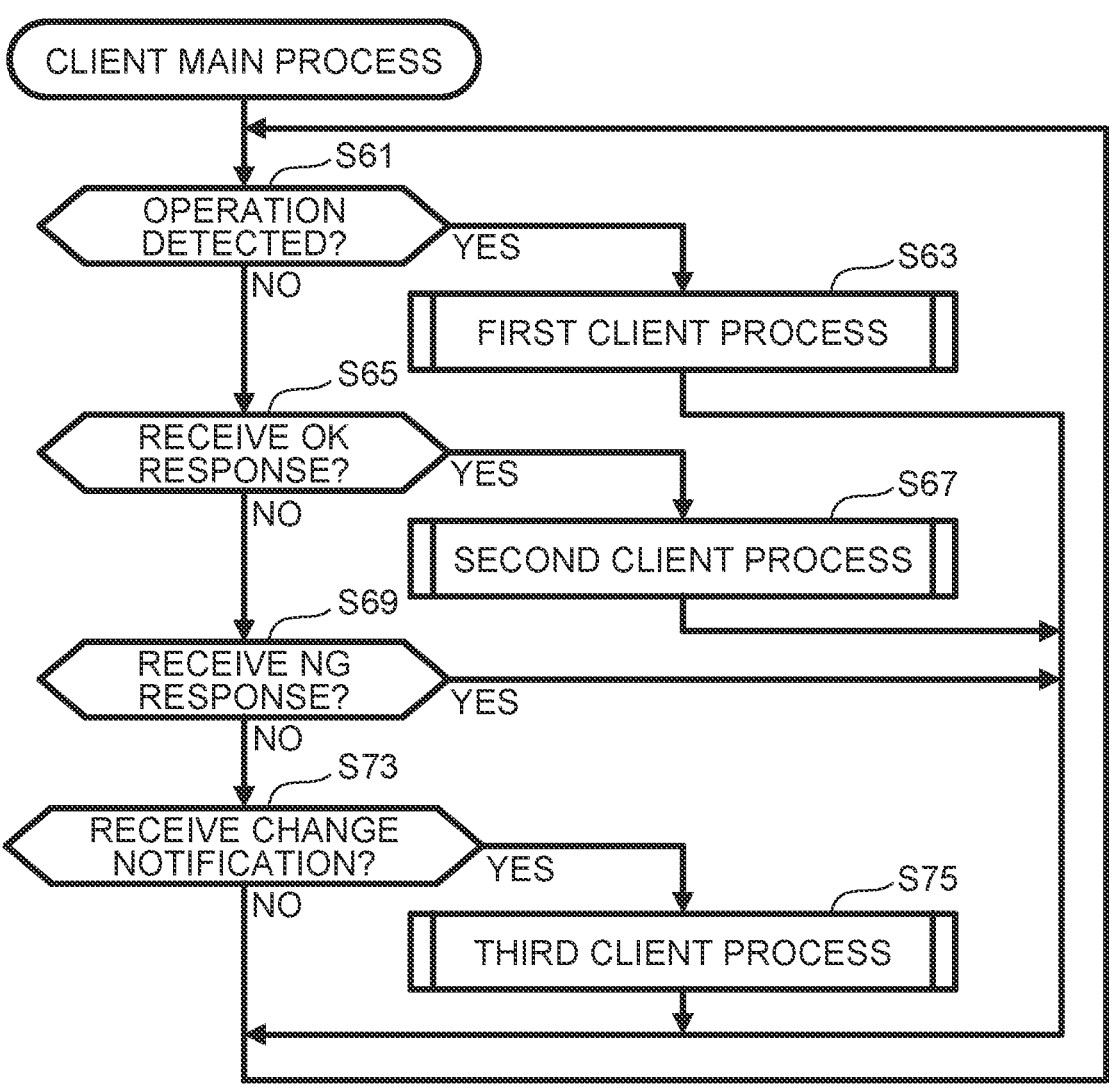
FIG. 10 is a flowchart of a client main process.

As shown in FIG. 10, the CPU 31 determines whether an operation for editing the client document (hereinafter referred to as an "editing operation") has been detected via the input unit 34 (S61). When it is determined that the editing operation is detected (S61: YES), the CPU 31 executes a first client process (see FIG. 11) (S63).

Figure 11:
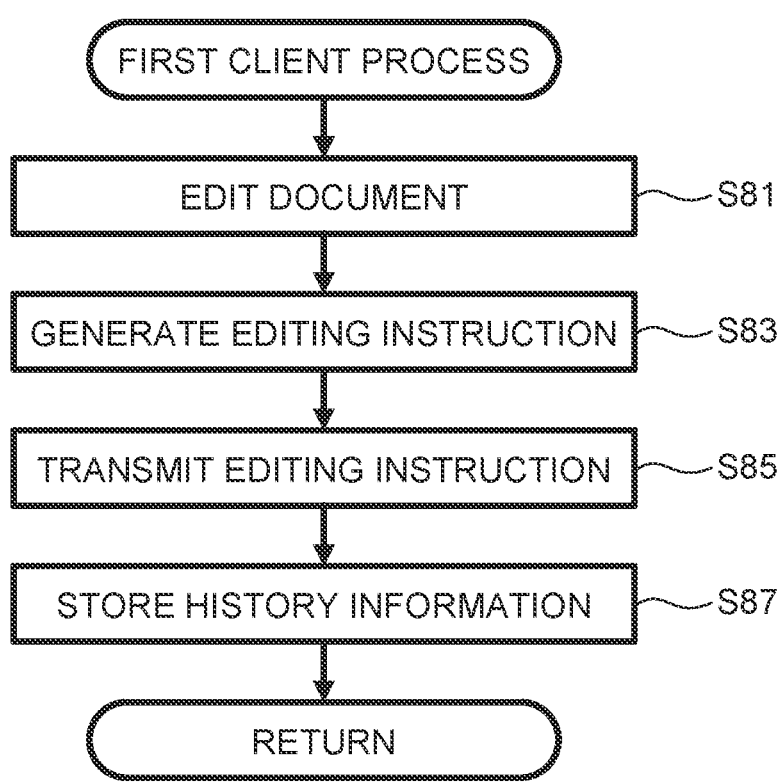
FIG. 11 is a flowchart of a first client process.

Referring to FIG. 11, the first client process will be described. The CPU 31 edits the client document in accordance with the editing operation (S81). The CPU 31 generates an editing instruction including a version of the client document, a command corresponding to the editing operation, a path, and a value (S83). The CPU 31 transmits the generated editing instruction to the server apparatus 2 (S85). CPU 31 stores a history record including the version, the command, the path, and the value included in the editing instruction in the storage unit 32 as history information (S87). The CPU 31 ends the first client process and returns the process to the client main process (see FIG. 10). As illustrated in FIG. 10, after completing the first client process (S63), the CPU 31 returns the processing to S61.

When it is determined that the editing operation is not detected (S61: NO), the CPU 31 determines whether or not the OK response transmitted from the server apparatus 2 is received (S65). When it is determined that the OK response is received (S65: YES), the CPU 31 executes a second client process (see FIG. 12) (S67).

Figure 12:
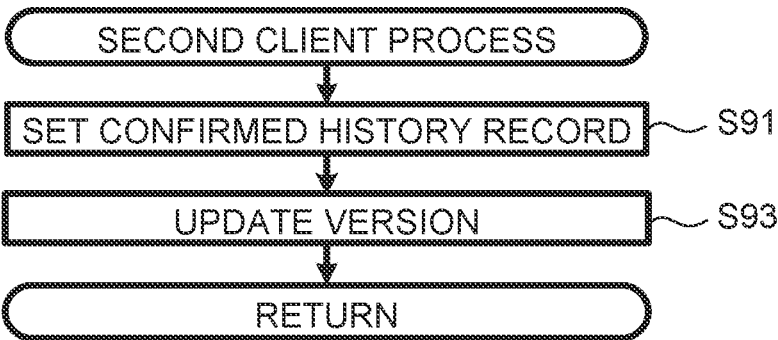
FIG. 12 is a flowchart of a second client process.

Referring to FIG. 12, the second client process will be described. The CPU 31 sets a history record including the pre-update version indicated by the version update information included in the received OK response among the history information stored in the storage unit 32 as a confirmed history record (S91). CPU 31 updates the version of the client document to the post-update version indicated by the version update information included in the received OK response (S93). The CPU 31 ends the second client process and returns the process to the client main process (see FIG. 10). As illustrated in FIG. 10, after completing the second client process (S67), the CPU 31 returns the processing to S61.

When it is determined that the OK response is not received (S65: NO), the CPU 31 determines whether the NG response transmitted from the server apparatus 2 is received (S69). When it is determined that the NG response is received (S69: YES), the CPU 31 returns the processing to S61.

When it is determined that the NG response is not received (S69: NO), the CPU 31 determines whether the change notification transmitted from the server apparatus 2 is received (S73). When it is determined that the change notification is not received (S73: NO), the CPU 31 returns the processing to S61. When it is determined that the change notification is received (S73: YES), the CPU 31 executes a third client process (see FIG. 13) (S75). After completing the third client process (S75), the CPU 31 returns the processing to S61.

Figure 13:
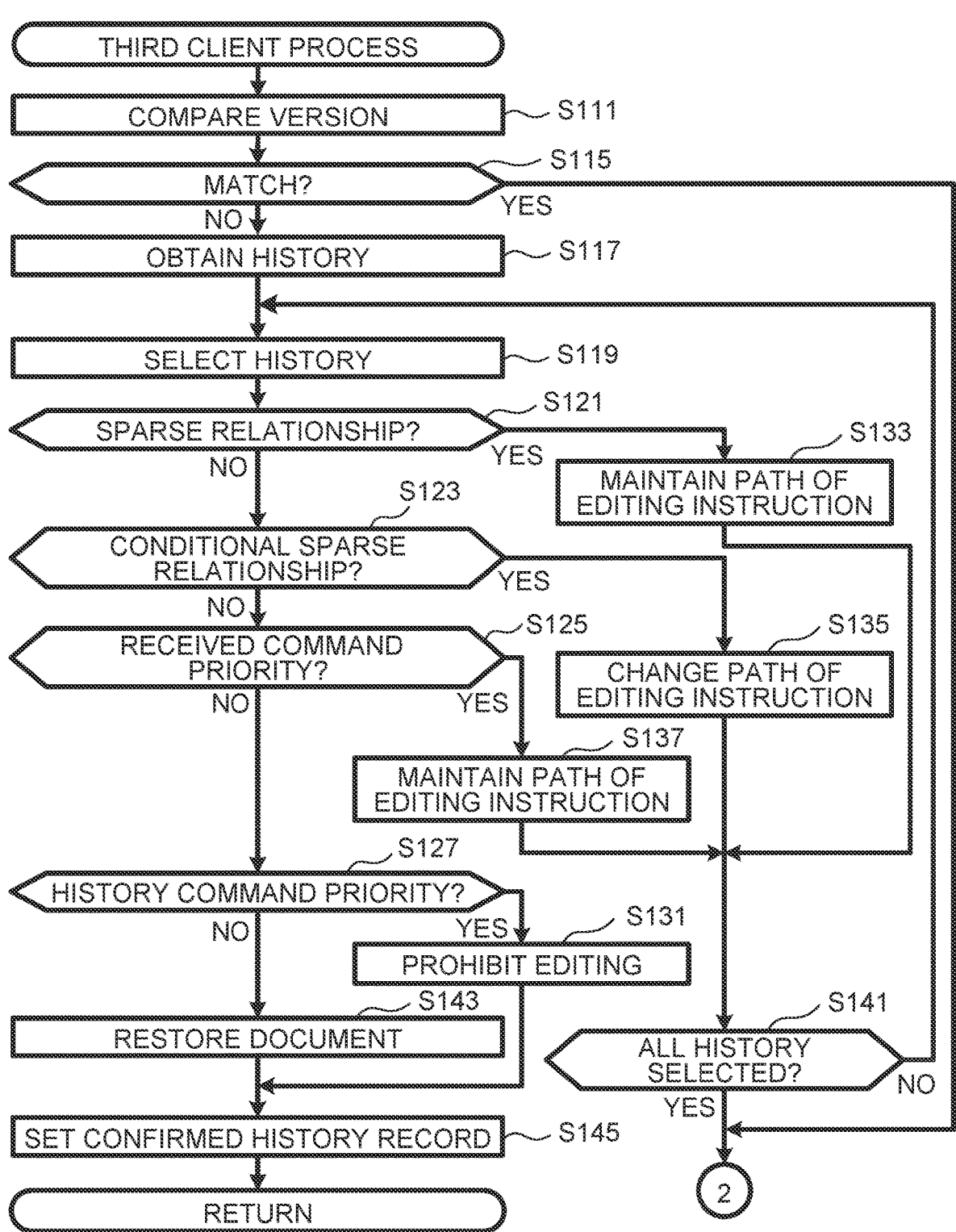
FIG. 13 is a flowchart of a third client process.

Referring to FIG. 13, the third client process will be described. The CPU 31 compares the pre-update version of the version update information included in the received change notification with the version of the client document stored in the storage unit 32 (S111). When it is determined that the pre-update version in the version update information included in the change notification matches the version of the client document stored in the storage unit 32 (S115: YES), the CPU 31 advances the processing to S151 (see FIG. 14).

Figure 14:
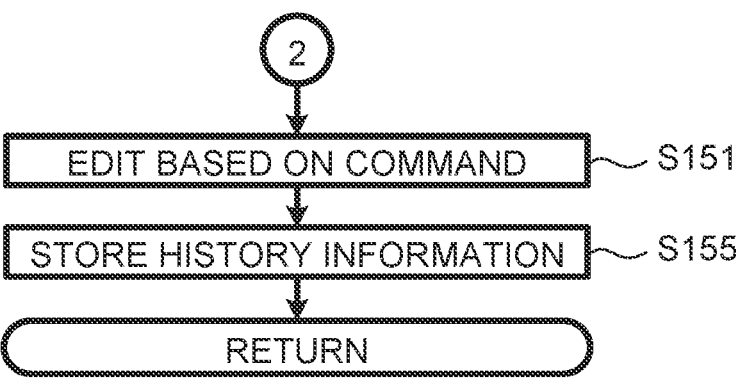
FIG. 14 is a flowchart of the third client process, which is a continuation of FIG. 13.

As shown in FIG. 14, the CPU 31 obtains the command and the path included in the change notification. CPU 31 edits the editing object indicated by the obtained path in the client document with the editing method indicated by the obtained command (S151). The CPU 31 stores a history record including the version update information, the command, the path, and the value included in the change notification received in S73 (see FIG. 10) in the storage unit 32 as history information. (S155). The CPU 31 returns the processing to the client main process (see FIG. 10).

On the other hand, as illustrated in FIG. 13, when the CPU 31 determines that the pre-update version of the version update information included in the received change notification is different from the version of the client document stored in the storage unit 32 (S115: NO), the CPU 31 advances the processing to S117. The CPU 31 obtains the history information stored in the storage unit 32 (S117). The CPU 31 selects one history record that is not selected in S119 from among history records that are not set as confirmed in S145 and S91 (S119). Based on the command and the path included in the selected history record, and the command and the path included in the change notification received in S73 (see FIG. 10), the CPU 31 newly determines with the following method an editing object to be edited with the editing method indicated in the command included in the change notification in the client document.

The CPU 31 determines whether the change notification received in S73 and the history record selected at S119 are in the sparse relationship (S121). In a case where the CPU 31 determines that they are in the sparse relationship (S121: YES), the CPU 31 advances the processing to S133. The CPU 31 maintains the path included in the change notification (S133). In this case, in the client document, the editing object indicated by the path included in the change notification is edited with the editing method indicated in the command indicated in the change notification (S151; see FIG. 14). The CPU 31 advances the processing to S141.

If the CPU 31 determines that there is no sparse relationship (S121: NO), the CPU 31 determines whether there is the conditional sparse relationship between the change notification received in S73 and the history record selected in S119 (S123). In a case where the CPU 31 determines that there is the conditional sparse relationship (S123: YES), the CPU 31 advances the processing to S135. In this case, since the client document is changed based on the change notification, the editing object of the client document to be edited based on the history record to be subsequently executed is changed, the CPU 31 determines the path indicating the editing object after the change (S135). In this case, the client document before edit based on the history information is first edited based on the change notification, and then the editing object indicated by the determined path is edited with the editing method indicated in the command indicated by the history information (S151; see FIG. 14). The CPU 31 advances the processing to S141.

If the CPU 31 determines that there is no conditionally sparse relationship (S123: NO), the CPU 31 determines whether the change notification received in S73 and the history record selected in S119 are in the received command priority relationship (S125). When it is determined that they are in the received command priority relationship (S125: YES), the CPU 31 advances the processing to S137. The CPU 31 maintains the path included in the change notification (S137). In this case, in the client document, the editing object indicated by the path included in the change notification is edited with the editing method indicated in the command indicated in the change notification (S151; see FIG. 14). The CPU 31 advances the process to S141.

The CPU 31 determines whether all history records in the history information that have not been set as the confirmed history record has been selected in S119 (S141). If an unselected history record remains (S141: NO), the CPU 31 returns the processing to S119. The CPU 31 selects an unselected history record (S119) and advances the process. When the CPU 31 determines that all history records that have not been set as the confirmed history record has been selected in S119 (S141: YES), the CPU 31 advances the processing to S151 (see FIG. 14).

As shown in FIG. 14, the CPU 31 obtains the command included in the change notification and the path determined in S133, S135, or S137 (see FIG. 13). The CPU 31 edits the editing object indicated by the obtained path in the client document with the editing method indicated by the obtained command (S151). The CPU 31 stores the version update information, the command, and the value included in the change notification received in S73 (see FIG. 10), and the history record including the path determined in S133, S135, or S137 (see FIG. 13) in the storage unit 32 as history information (S155). The CPU 31 returns the process to the client main process (see FIG. 10).

On the other hand, as illustrated in FIG. 13, when the CPU 31 determines that there is no received command priority relationship (S125: NO), the CPU 31 determines whether the change notification received in S73 and the history record selected in S119 are in the history command priority relationship (S127). When it is determined that they are in the history command priority relationship (S127: YES), the CPU 31 prohibits editing the client document (S131). The CPU 31 advances the processing to S145. On the other hand, when it is determined that there is no history command priority relationship (S127: NO), the CPU 31 determines that the change notification received in S73 and the history record selected in S119 are in the conflict relationship. The CPU 31 restores the client document to the state before edit based on the history record (S143). The CPU 31 sets the history record selected in S119 as the confirmed history record (S145). The CPU 31 returns the processing to the client main process (see FIG. 10).

As described above, when the version of the document of the editing object to be edited by the client apparatus 3 is different from the version of the server document (S15: NO), the server apparatus 2 newly determines the editing object of the server document based on the command and the path included in the editing instruction transmitted by the client apparatus 3 and the command and the path included in the history record (S21 to S39). Hereinafter, in the description of advantages related to the server apparatus 2, the editing method indicated in the command included in the editing instruction transmitted by the client apparatus 3 is referred to as a "first editing method", and the editing object indicated by the path included in the editing instruction is referred to as a "first editing object". The editing method indicated in the command included in the history record stored in the storage unit 22 of the server apparatus 2 is referred to as a "second editing method", and the editing object indicated by the path included in the history record is referred to as a "second editing object".

The server apparatus 2 determines a new editing object of the server document (i.e., a second document) such that a result of editing the first editing object, with the first editing method, of the document of the version (i.e., a first document) included in the editing instruction and then editing the second editing object included in the edited first document with the second editing method is identical to a result of editing the new editing object of the second document. In this case, a result of editing the first document based on the first editing object and the first editing method and then editing the edited first document based on the second editing object and the second editing method is identical to a result of editing the first document based on the second editing object and the second editing method and then editing the edited first document based on the first editing object and the first second editing method. Therefore, when a plurality of client apparatuses 3 edit a common server document, the server apparatus 2 obtains a common editing result even if each client apparatus 3 edits the common server document at a different timing. Therefore, the client apparatus 3 efficiently edits the common server document in cooperation with the other client apparatuses 3.

When the editing instruction received from the client apparatus 3 and the history record are in the sparse relationship (S21: YES), the server apparatus 2 maintains the path included in the editing instruction (S33). In this case, the server apparatus 2 uses the path included in the editing instruction transmitted from the client apparatus 3 so as to edit the second document with the first editing method indicated in the command.

When the editing instruction received from the client apparatus 3 and the history record are in the conditional sparse relationship (S23: YES), the server apparatus 2 changes the first editing object indicated by the path included in the editing instruction (S35). In this case, the server apparatus 2 realizes editing the second document, by changing the first editing object, such that a result of editing the second document is identical to a result of editing the first editing object of the first document with the first editing method and then editing the second editing object of the edited first document with the second editing method.

When the editing instruction received from the client apparatus 3 and the history record are in the received command priority relationship (S25: YES), the server apparatus 2 maintains the path included in the editing instruction (S37). In this case, the server apparatus 2 uses the path included in the editing instruction transmitted from the client apparatus 3 and edits the second document with the first editing method indicated in the command.

When the editing instruction received from the client apparatus 3 and the history record are in the history command priority relationship or the conflict relationship (S27: YES/S27: NO), the server apparatus 2 prohibits editing the second document (S31). Thus, the server apparatus 2 prohibits editing the second document when there is no editing method to edit the second document such that a result of editing the second document is identical to a result of editing the first editing object of the first document with the first editing method and then editing the second editing object of the edited first document with the second editing method.

When the pre-update version included in the version update information in the change notification notified by the server apparatus 2 does not match the version of the client document stored in the storage unit 32 (S115: NO), the client apparatus 3 newly determines an editing object of the client document based on the command and the path included in the change notification transmitted by the server apparatus 2 and the command and the path included in the history record (S121 to S137). Hereinafter, in the description of advantages related to the client apparatus 3, the editing method indicated in the command included in the change notification transmitted by the server apparatus 2 is referred to as a "first editing method". The editing object indicated by the path included in the change notification is referred to as a "first editing object". The editing method indicated in the command included in the history record stored in the storage unit 32 of the client apparatus 3 is referred to as a "second editing method". The editing object indicated by the path included in the history record is referred to as a "second editing object".

The client apparatus 3 determines a new editing object of the client document such that a result of editing the new editing object of the client document after edited based on the history record (i.e., a second document) is identical to a result of editing the first editing object, with the first editing method, of the client document before edit based on the history record (i.e., a first document) and then editing the second editing object of the edited first document with the second editing method. In this case, a result of editing the first document based on the first editing object and the first editing method and then editing the edited first document based on the second editing object and the second editing method is identical to a result editing the first document based on the second editing object and the second editing method and then editing the edited first document based on the first editing object and the first editing method. In this case, the server apparatus 2 appropriately edits the client document regardless of a timing when the client document is edited thereby the client apparatus 3 transmits the editing instruction and a timing when client document is edited based on reception of the change notification by the client apparatus 3.

If the change notification received from the server apparatus 2 and the history record are in the sparse relationship (S121: YES), the client apparatus 3 maintains the path included in the change notification (S133). In this case, the client apparatus 3 uses the path included in the change notification transmitted from the server apparatus 2 and edits the second document with the first editing method indicated in the command.

When the change notification received from the server apparatus 2 and the history record are in the conditional sparse relationship (S123: YES), the client apparatus 3 changes the second editing object indicated by the path included in the history information (S135). In this case, the client apparatus 3 realizes editing the first document, by changing the second editing object, such that a result of editing the first document is identical to a result of editing the second editing object of the first document with the second editing method and then editing the first editing object of the edited first document with the first editing method.

] If the change notification received from the server apparatus 2 and the history record are in the received command priority relationship (S125: YES), the client apparatus 3 maintains the path included in the change notification (S137). In this case, the client apparatus 3 uses the path included in the change notification transmitted from the server apparatus 2 and edits the second document with the first editing method indicated in the command.

When the change notification received from the server apparatus 2 and the history record are in the history command priority relationship (S127: YES), the client apparatus 3 prohibits editing the second document (S131). Thus, the client apparatus 3 prohibits editing the second document when there is no editing method to edit the second document such that a result of editing the second document is identical to a result of editing the first editing object of the first document with the first editing method and then editing the second editing object of the edited first document with the second editing method.

When the change notification received from the server apparatus 2 and the history record are in the conflict relationship (S127: NO), the client apparatus 3 replaces the second document with the first document (S143). As a result, the client document stored in the client apparatus 3 is identical to the server document stored in the server apparatus 2, and the client apparatus 3 and the server apparatus 2 are synchronized with each other.

Modification

Figure 15:
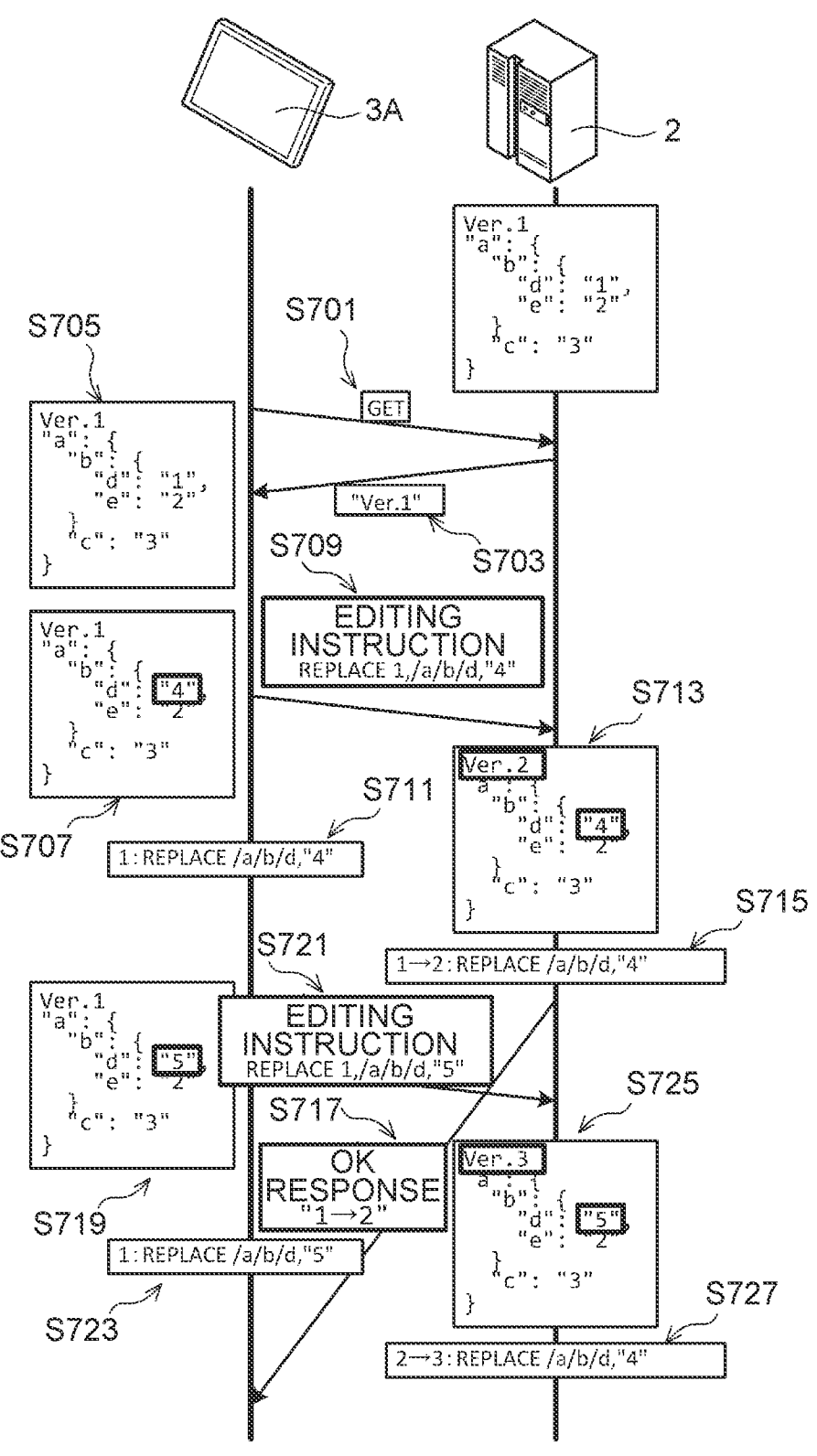
FIG. 15 is a diagram showing a sixth communication sequence.

In the sixth communication sequence illustrated in FIG. 15, the client document is edited only by the user of the client apparatus 3A, and the server document of the server apparatus 2 is also edited in the same manner. The sixth communication sequence is different from the first communication sequence (see FIG. 3) in that the client document is repeatedly edited by the user of the client apparatus 3A. In FIG. 15, the client apparatus 3B is omitted. In the sixth communication sequence, documents stored in the server apparatus 2 and the client apparatus 3 are shown in the JSON format. Description of a procedure similar to that of the first communication sequence will be simplified.

The client apparatus 3A obtains a document of Ver. 1 from server apparatus 2 (S701, S703). The client apparatus 3A stores the received document of Ver. 1 in the storage unit 32 as a client document (S705).

It is assumed that the user of the client apparatus 3A inputs an operation of changing the value of the path "/a/b/d" of the client document of Ver. 1 from "1" to "4". In this case, the client apparatus 3A edits the client document in accordance with the user's operation (S707). The client apparatus 3A transmits an editing instruction including the command "REPLACE", the version "1", the path "/a/b/d", and the value "4" to the server apparatus 2 (S709). Based on the transmitted editing instruction, the client apparatus 3A stores the version, the command, the path, and the value as history information in the storage unit 32 (S711).

The server apparatus 2 receives the editing instruction transmitted from the client apparatus 3A in S711 and determines that the version "1" included in the editing instruction matches the version "1" of the server document. The server apparatus 2 edits the server document based on the editing instruction (S713) and updates the version from Ver. 1 to Ver. 2 (S713). Further, the server apparatus 2 stores history information in the storage unit 22 (S715). The server apparatus 2 transmits an OK response including the version update information "1->2" to the client apparatus 3A (S717).

It is assumed that before the client apparatus 3A receives the OK response transmitted by the server apparatus 2 in S717, the user of the client apparatus 3A inputs an operation of changing the value of the path "/a/b/d" of the client document from "4" to "5". In this case, the client apparatus 3A edits the client document edited in S707 in accordance with the user's operation (S719). Since the client apparatus 3A has not received the OK response with respect to the edit in S707, the version of the client document is not updated and remains Ver. 1. The client apparatus 3A transmits an editing instruction including the command "REPLACE", the version "1", the path "/a/b/d", and the value "5" to the server apparatus 2 (S721). Based on the transmitted editing instruction, the client apparatus 3A stores the version, the command, the path, and the value as history information in the storage unit 32 (S723).

The server apparatus 2 receives the editing instruction transmitted from the client apparatus 3A in S721. The server apparatus 2 determines that the version "1" included in the received editing instruction is different from the version "2" of the server document.

Here, in the fourth communication sequence (see FIG. 6), when the command and the path in the history information match the command and the path in the editing instruction, the server apparatus 2 does not edit the server document (S657, see FIG. 6). However, in the sixth communication sequence, when the transmission destination to which the editing instruction is transmitted in S715 and the transmission source of the subsequently received editing instruction are both the client apparatus 3A, the server apparatus 2 edits the server document stored in the storage unit 22 even when the command and the path in the history information match the command and the path in the editing instruction (S725). Based on the transmitted editing instruction, the server apparatus 2 stores the version, the command, the path, and the value as history information in the storage unit 32 (S727).

The present invention is not limited to the above-described embodiment and modification examples, and various modifications are acceptable. The server document may not be stored in the storage unit 22 of the server apparatus 2. The client document may not be stored in the storage unit 32 of the client apparatus 3. Alternatively, one or both of the server document and the client document may be stored in a data server, e.g., a cloud server, connected to the network line 4.

The relationship between the editing instruction and the history information determined in the server apparatus 2 may not be limited to the sparse relationship, the conditional sparse relationship, the received command priority relationship, the history command priority relationship, or the conflict relationship. Similarly, the relationship between the change notification and the history information determined in the client apparatus 3 may not be limited to the sparse relationship, the conditional sparse relationship, the received command priority relationship, the history command priority relationship, or the conflict relationship. Alternatively, one or both of the server apparatus 2 and the client apparatus 3 may determine only some of relationships described above. One or both of the server apparatus 2 and the client apparatus 3 may determine a relationship other than the above-described relationships. Although the JSON format and the array method are specifically described above as examples of the format of the document, the format of the document may be another format.

The server apparatus 2 has updated the version of the server document by adding one (1) (S53). Alternatively, the server apparatus 2 may control an edition in addition to a version of the server document. In this case, server apparatus 2 may update the version and the edition separately. The server apparatus 2 may control the version as a random number.

In the server apparatus of the present invention, the CPU 21 that performs S11 is an example of the "receiving means". The CPU 21 that performs S51 is an example of the "editing means", the "first editing means", and the "second editing means". The CPU 21 that performs S53 is an example of the "updating means". The CPU 21 that performs S55 is an example of the "storing means". The CPU 21 that performs S31 is an example of the "first editing prohibiting means" and the "second editing prohibiting means".

In the client apparatus of the present invention, the CPU 31 that performs S85 is an example of the "transmitting means". The CPU 31 that performs S73 is an example of the "receiving means". The CPU 31 that performs S93 is an example of the "updating means". The CPU 31 that performs S151 is an example of the "editing means", the "first editing means", the "second editing means", and the "third editing means". The CPU 31 that performs S155 is an example of the "storing means". The CPU 31 that performs S131 is an example of the "first editing prohibiting means". The CPU 31 that performs S141 is an example of the "undo means".

In the computer-implemented method in the server apparatus of the present invention, the processing of S11 is an example of the "receiving step". The processing of S51 is an example of the "editing step", the "first editing step", and the "second editing step". The processing of S53 is an example of the "updating step". The processing of S55 is an example of the "storing step". The processing of S31 is an example of the "first editing prohibition step" or the "second editing prohibition step".

In the computer-implemented method in the client apparatus of the present invention, the processing of S85 is an example of the "transmitting step". The processing of S73 is an example of the "receiving step". The processing of S93 is an example of the "updating step". The processing of S151 is an example of the "editing step" or the "first editing step". The processing of S155 is an example of the "storing step". The processing of S131 is an example of the "first editing prohibiting step". The processing of S141 is an example of the "undo step".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A server apparatus for communicating with a client apparatus comprising:

receiving means for receiving, from the client apparatus, an editing instruction for editing a server document editable by the server apparatus, the editing instruction including an editing method, an editing object, and a version of a document;

editing means for editing the server document according to the editing object and the editing method included in the editing instruction;

updating means for updating a version of the server document edited by the editing means; and storing means for storing, as history information, the editing object and the editing method included in the editing instruction received by the receiving means;

wherein the editing means comprises:

first editing means for editing a first editing object of the server document with a first editing method when it is determined that each of a version included in a first editing instruction received from the client apparatus by the receiving means and the version of the server document is a first version, the first editing object and the first editing method being included in the first editing instruction; and second editing means for determining a new editing object based on the first editing object, the first editing method, a second editing object and a second editing method, and for editing the new editing object of the server document of a second version with the first editing method when it is determined that a version included in a first editing instruction received from the client apparatus by the receiving means is the first version and the version of the server document is the second version different from the first version, the second editing object being included in the history information, the second editing method being included in the history information, the new editing object being included in the server document of the second version, and wherein the second editing means determines the new editing object such that a result of editing the new editing object of a second document is identical to a result of editing the first editing object of a first document with the first editing method and then editing the second editing object of the edited first document with the second editing method, the first document being the document of the first version included in the first editing instruction, the second document being the server document of the second version.

2. The server apparatus according to claim 1, wherein the second editing means edits the first editing object of the second document with the first editing method when a result of editing the first editing object of the first document with the first editing method and then editing the second editing object of the edited first document with the second editing method is identical to a result of editing the first editing object of the second document with the first editing method.

3. The server apparatus according to claim 2, wherein the second editing means edits a changed editing object of the second object with the first editing method when an editing object to be edited with the first editing method is changed from the first editing object to the changed editing object due to editing the second editing object of the first document with the second editing method.

4. The server apparatus according to claim 3, wherein the second editing means edits the first editing object of the second document with the first editing method when a priority of the first editing method is higher than a priority of the second editing method.

5. The server apparatus according to claim 1, wherein the editing means comprises first edit prohibiting means for not editing the second document when the first editing method and the second editing method are the same, and when the first editing object and the second editing object are the same.

6. The server apparatus according to claim 5, wherein the editing means comprises second edit prohibiting means for not editing the second document when one of the first editing object or the second editing object is included in the other of the first editing object or the second editing object.

7. The server apparatus according to claim 1, wherein the updating means updates the version by adding one, and wherein a value of the first version is greater than a value of the second version.

8. A client apparatus for communicating with a server apparatus comprising:

transmitting means for transmitting an editing instruction for editing a server document editable by the server apparatus when editing a client document editable by the client apparatus, the editing instruction including an editing method, an editing object, and a version of the client document;

receiving means for receiving a change notification from the server apparatus, the change notification including version update information indicating a pre-update version and a post-update version, the editing method and the editing object, the pre-update version being a version of the document before editing, a post-update version being a version of the document after editing;

editing means for editing the client document according to the editing object and the editing method included in the change notification received by the receiving means;

updating means for updating the version of the client document edited by the editing means; and storing means for storing, as history information, the version, the editing object and the editing method included in the editing instruction transmitted by the transmitting means and for storing, as the history information, the version, the editing object and the editing method included in the change notification received by the receiving means, wherein the editing means comprises:

first editing means for editing a first editing object of the client document with a first editing method when determined that the pre-update version included in the change notification is identical to the version of the client document, the first editing object and the first editing method being included in the change notification; and second editing means for determining a new editing object based on the first editing object, the first editing method, a second editing object and a second editing method and for editing the new editing object of the client document with the first editing method when determined that the pre-update version included in the change notification is not identical to the version of the client document, the second editing object being included in the history information, the second editing method being included in the history information, and wherein the second editing means determines the new editing object such that a result of editing the new editing object of a second document is identical to a result of editing the first editing object of a first document with the first editing method and then editing the second editing object of the edited first document with the second editing method, the first document being the document before the second editing object is edited with the second editing method, the second document being the client document after the second editing object of the client document is edited with the second editing method.

9. The client apparatus according to claim 8, wherein the second editing means edits the first editing object of the second document with the first editing method when a result of editing the first editing object of the first document with the first editing method and then editing the second editing object of the edited first document with the second editing method is identical to a result of editing the first editing object of the second document with the first editing method.

10. The client apparatus according to claim 9, wherein the editing means comprises:

third editing means for editing a changed editing object of the edited first document with the second editing method when an editing object to be edited with the second editing method is changed from the second editing object to the changed editing object due to editing the first editing object of the first document with the first editing method.

11. The client apparatus according to claim 10, wherein the second editing means edits the first editing object of the second document with the first editing method when a priority of the first editing method is higher than a priority of the second editing method.

12. The client apparatus according to claim 8, wherein the editing means comprises:

edit prohibiting means for not editing the second document when the first editing method and the second editing method are the same, and when the first editing object and the second editing object are the same.

13. The client apparatus according to claim 8, wherein the editing means comprises:

undo means for replacing the second document with the first document when one of the first editing object or the second editing object is included in the other of the first editing object or the second editing object.

14. A computer-implemented method in a server apparatus for communicating with a client apparatus, the method comprising:

a receiving step for receiving, from the client apparatus, an editing instruction for editing a server document editable by the server apparatus, the editing instruction including an editing method, an editing object, and a version of a document;

an editing step for editing the server document according to the editing object and the editing method included in the editing instruction;

an updating step for updating a version of the server document edited by the editing means; and a storing step for storing, as history information, the editing object and the editing method included in the editing instruction received by the receiving means;

wherein the editing step comprises:

first editing step for editing a first editing object of the server document with a first editing method when it is determined that each of a version included in a first editing instruction received from the client apparatus by the receiving means and the version of the server document is a first version, the first editing object and the first editing method being included in the first editing instruction; and second editing step for determining a new editing object based on the first editing object, the first editing method, a second editing object and a second editing method and for editing the new editing object of the server document of a second version with the first editing method when it is determined that a version included in a first editing instruction received from the client apparatus by the receiving means is the first version and the version of the server document is the second version different from the first version, the second editing object being included in the history information, the second editing method being included in the history information, the new editing object being included in the server document of the second version, and wherein the second editing step determines the new editing object such that a result of editing the new editing object of a second document is identical to a result of editing the first editing object of a first document with the first editing method and then editing the second editing object of the edited first document with the second editing method, the second document being the server document of the second version, the first document being the document of the first version included in the first editing instruction.

15. A computer-implemented method in a client apparatus for communicating with a server apparatus, the method comprising:

transmitting means for transmitting an editing instruction for editing a server document editable by the server apparatus when edited editing a client document editable by the client apparatus, the editing instruction including an editing method, an editing object, and a version of the client document;

receiving means for receiving a change notification from the server apparatus, the change notification including version update information indicating a pre-update version and a post-update version, the editing method and the editing object, the pre-update version being a version of the document before editing, a post-update version being a version of the document after editing;

editing means for editing the client document according to the editing object and the editing method included in the change notification received by the receiving means;

updating means for updating the version of the client document edited by the editing means; and storing means for storing, as history information, the version, the editing object and the editing method included in the editing instruction transmitted by the transmitting means and for storing, as the history information, the version, the editing object and the editing method included in the change notification received by the receiving means, wherein the editing means comprises:

first editing means for editing a first editing object of the client document with a first editing method when determined that the pre-update version included in the change notification is identical to the version of the client document, the first editing object and the first editing method being included in the change notification; and second editing means for determining a new editing object based on the first editing object, the first editing method, a second editing object and a second editing method and for editing the new editing object of the client document with the first editing method when determined that the pre-update version included in the change notification is not identical to the version of the client document, the second editing object being included in the history information, the second editing method being included in the history information, and wherein the second editing means determines the new editing object such that a result of editing the new editing object of a second document is identical to a result of editing the first editing object of a first document with the first editing method and then editing the second editing object of the edited first document with the second editing method, the first document being the document before the second editing object is edited with the second editing method, the second document being the client document after the second editing object of the client document is edited with the second editing method.

* * * * *